US006359890B1

(12) United States Patent
Shoho et al.

(10) Patent No.: US 6,359,890 B1
(45) Date of Patent: Mar. 19, 2002

(54) RE-CONNECTION METHOD FOR COMMUNICATION NETWORK SYSTEM

(75) Inventors: Tatsuya Shoho; Yasuhiko Uchida, both of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/083,590

(22) Filed: May 22, 1998

(30) Foreign Application Priority Data

Aug. 6, 1997 (JP) .............................................. 9-211670

(51) Int. Cl.⁷ ......................... H04L 12/28; H04L 12/56
(52) U.S. Cl. ........................ 370/396; 370/410; 370/432
(58) Field of Search ................................ 370/377, 384, 370/385, 389, 390, 410, 396, 397, 400, 401, 409, 426, 432, 312, 352–356; 379/230

(56) References Cited

U.S. PATENT DOCUMENTS

| | | | | |
|---|---|---|---|---|
| 5,410,591 A | * | 4/1995 | Takahashi | 379/201 |
| 5,471,519 A | * | 11/1995 | Howe et al. | 379/67 |
| 5,600,643 A | | 2/1997 | Robrock, II | |
| 6,125,123 A | * | 9/2000 | Furuno | 370/467 |
| 6,128,305 A | * | 10/2000 | Hjalmtysson et al. | 370/410 |

FOREIGN PATENT DOCUMENTS

EP 0 303 830 2/1989

OTHER PUBLICATIONS

Multicast Network Connection Architecture 8204 IBM Systems Journal 34(1995) Fall. No. 4 Armonk, NY, US pp. 590–602.

* cited by examiner

*Primary Examiner*—Ajit Patel
(74) *Attorney, Agent, or Firm*—Rosenman & Colin LLP

(57) ABSTRACT

There is provided a re-connection method for a communication network system that enables a multipoint connection by which the same data is transmitted from a first subscriber accommodated in a first switch to a plurality of second subscriber accommodated in a second switch, the method comprising the steps of: transmitting the data by the second switch to at least one of the second subscribers connected with the second switch; re-transmission requesting by the second switch to the first switch for re-transmitting of the data to the at least one of the second subscribers; and re-connection requesting by the first switch to the second switch for re-connecting the at least one of the second subscribers which has not connected with the second switch.

18 Claims, 29 Drawing Sheets

FIG. 8
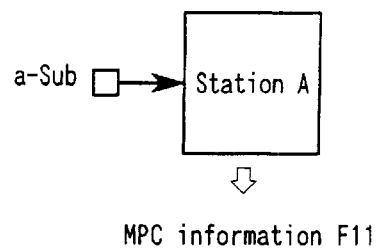
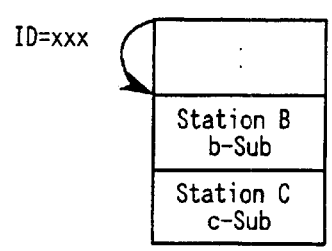
FIG. 9
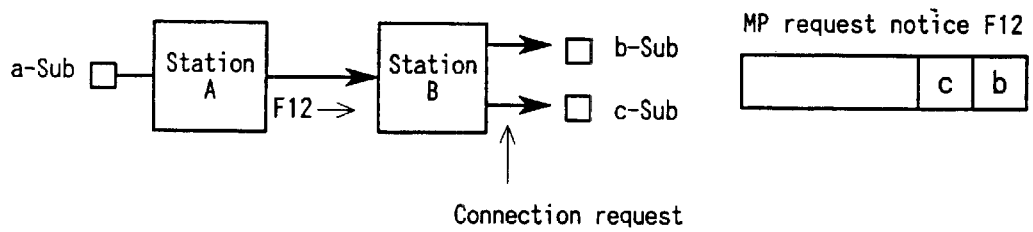
FIG. 10
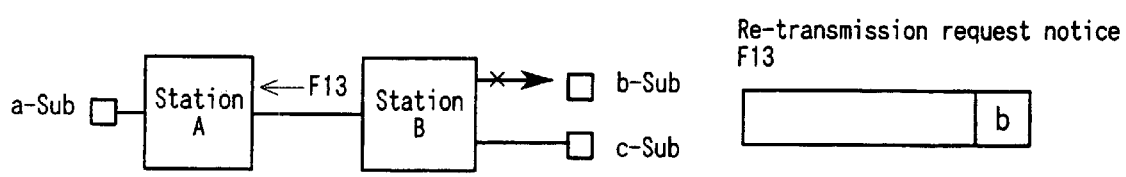

Connection request

Re-transmission data storage area F64

BEFORE DATA TRANSMITTING

DURING DATA TRANSMITTING

RE-CONNECTION METHOD FOR COMMUNICATION NETWORK SYSTEM

BACKGROUND OF THE INVENTION

1. Field of the Invention

The present invention relates to a re-connection method for a communication network system which permits a multicast connection (multipoint connection) with a plurality of subscribers which are accommodated by a plurality of ATM (Asynchronous Transfer Mode) switches in a B-ISDN (Broadband Integrated Services Digital Network).

2. Related Arts

Currently, a B-ISDN (Broadband Integrated Services Digital Network) adoption that employs the ATM (Asynchronous Transfer Mode) technique is expected to constitute the next generation communication network. The ATM method is one whereby digital data to be transmitted are divided into data set having a constant length of 48 bytes, control data called a 5-byte header is added to the individual digital data sets, and the resultant data are transferred by hardware switching.

FIGS. 56A and 56B are diagrams showing a connection form for a B-ISDN. A B-ISDN permits communications not only while using the one-to-one connection, as in a conventional telephone network, as is shown in FIG. 56A, but also while using a multipoint connection shown in FIG. 56B whereby the same data can be transmitted to a plurality of locations.

Specifically, in FIG. 56A is shown a one-to-one connection between a subscriber a-Sub accommodated by a station A which is an ATM switch and a subscriber b-Sub accommodated by a station B which is an ATM switch. In FIG. 56B is shown a multipoint connection among a subscriber a-Sub accommodated by the station A, subscribers b-Sub and c-Sub accommodated by the station B, and subscribers d-Sub and e-Sub accommodated by a station C which is an ATM switch.

In a case where, due to insufficient bandwidth, a busy line or no response, at least one of the subscribers (subscribers b-sub, c-Sub, d-Sub and e-Sub in FIG. 56B) with whom the multipoint connection is requested, can not be connected with the subscriber (subscriber a-Sub) which is requesting the multipoint connection, conventionally the transmission of data keeps waiting until a connection with the pertinent subscriber can be established. Therefore, the transmission of data to subscribers which are ready to receive will be delayed.

Further, if data are transmitted even though there is a subscriber with whom a connection had not been established, the multipoint connection must be re-established after the transmission of data is terminated in order to send data to the specific subscriber. At this time, if a request for the multipoint connection is issued again, the same data again transmitted to the subscribers which have already received those data. This is a very uneconomical process.

SUMMARY OF THE INVENTION

It is, therefore, one object of the present invention to provide a re-connection method, for a communication network system which permits a multipoint connection, that ensures an efficient processing when there is a subscriber with whom a connection is not established for the multipoint connection, and also to provide a switch therefor.

To achieve the above object, according to a first aspect of the present invention, there is provided a re-connection method for a communication network system that enables a multipoint connection by which the same data is transmitted from a first subscriber accommodated in a first switch to a plurality of second subscribers accommodated in a second switch, the method comprising the steps of:

transmitting the data by the second switch to at least one of the second subscribers connected with the second switch;

re-transmission requesting by the second switch to the first switch for re-transmitting of the data to the at least one of the second subscribers; and re-connection requesting by the first switch to the second switch for re-connecting the at least one of the second subscriber which has not connected with the second switch.

According to a second aspect of the present invention, there is provided the re-connection method according to the first aspect, wherein the first switch stores information of the subscriber which has not connected with the second switch; and in the step of re-connection requesting, the first switch transmits the information to the second switch, and the second switch processes to connect to the subscriber based on the information.

According to a third aspect of the present invention, there is provided the re-connection method according to the first aspect, wherein the second switch stores information of the subscriber which has not connected with the second switch; and in the step of re-connection requesting, the second switch processes to connect to the subscriber based on the information.

According to a forth aspect of the present invention, there is provided the re-connection method according to the first aspect, wherein a database of the communication network system stores information of the subscriber which has not connected with the second switch; and in the step of re-connection requesting, the first switch access to the database to obtain the information and transmits the information to the second switch, and the second switch processes to connect to the subscriber based on the information.

According to a fifth aspect of the present invention, there is provided the re-connection method according to the first aspect, wherein a database of the communication network system stores information of the subscriber which has not connected with the second switch; and in the step of re-connection requesting, the second switch accesses to the database to obtain the information, and the second switch processes to connect to the subscriber based on the information.

According to a sixth aspect of the present invention, there is provided the re-connection method according to the first aspect, further comprising the step of:

re-transmitting the data to the second switch for the subscriber connected with the second switch, which has not connected with the second switch.

According to a seventh aspect of the present invention, there is provided the re-connection method according to the sixth aspect, the step of re-connection requesting is processed after completion of transmitting the data by the transmitting step; and in the re-transmitting step, the second switch transmits the data to the subscriber connected with the second switch, which has not connected with the second switch.

According to a eighth aspect of the present invention, there is provided the re-connection method according to the sixth aspect, wherein the first switch stores the data; the step of re-connection requesting is processed during transmitting the data by the transmitting step; and in the re-transmitting step, the first switch transmits the data to second switch for the subscriber connected with the second switch, which has not connected with the second switch during the transmitting the data by the transmitting step.

According to a ninth aspect of the present invention, there is provided the re-connection method for a communication network system that enables a multipoint connection by which the same data is transmitted from a first subscriber accommodated in a first switch to a plurality of second subscribers accommodated in a second switch, the method comprising the steps of:

transmitting the data by the second switch to at least one of the second subscribers connected with the second switch; storing the data in the second switch;

requesting for re-connection by the second switch to at least one of the second subscribers which has not connected with the second switch; and re-transmitting the data stored in the second switch to the subscriber connected with the second switch, which has not connected with the second switch.

According to a tenth aspect of the present invention, there is provided the re-connection method for a communication network system that enables a multipoint connection by which the same data is transmitted from a first switch to a second switch and a third switch, the method comprising the steps of:

transmitting the data to subscribers connected with the second and third switch, which are accommodated in the second and third switch respectively;

re-transmission requesting by the second switch to the first switch for re-transmitting the data to at least one of the second subscribers which has not connected with the second switch;

transmitting a notice that there is no subscriber which has not connected with the third switch from the third switch to the first switch; and re-connection requesting by the first switch to the second switch for re-connecting with at least one of the second subscribers which has not connected with the second switch.

Other features and advantages of the present invention will become rapidly apparent from the following description when taken in conjunction with the accompanying drawings.

BRIEF DESCRIPTION OF DRAWINGS

FIGS. 8 to 12 are diagrams for explaining a first embodiment of the present invention.

DETAILED DESCRIPTION OF THE PREFERRED EMBODIMENTS

Figure 1:
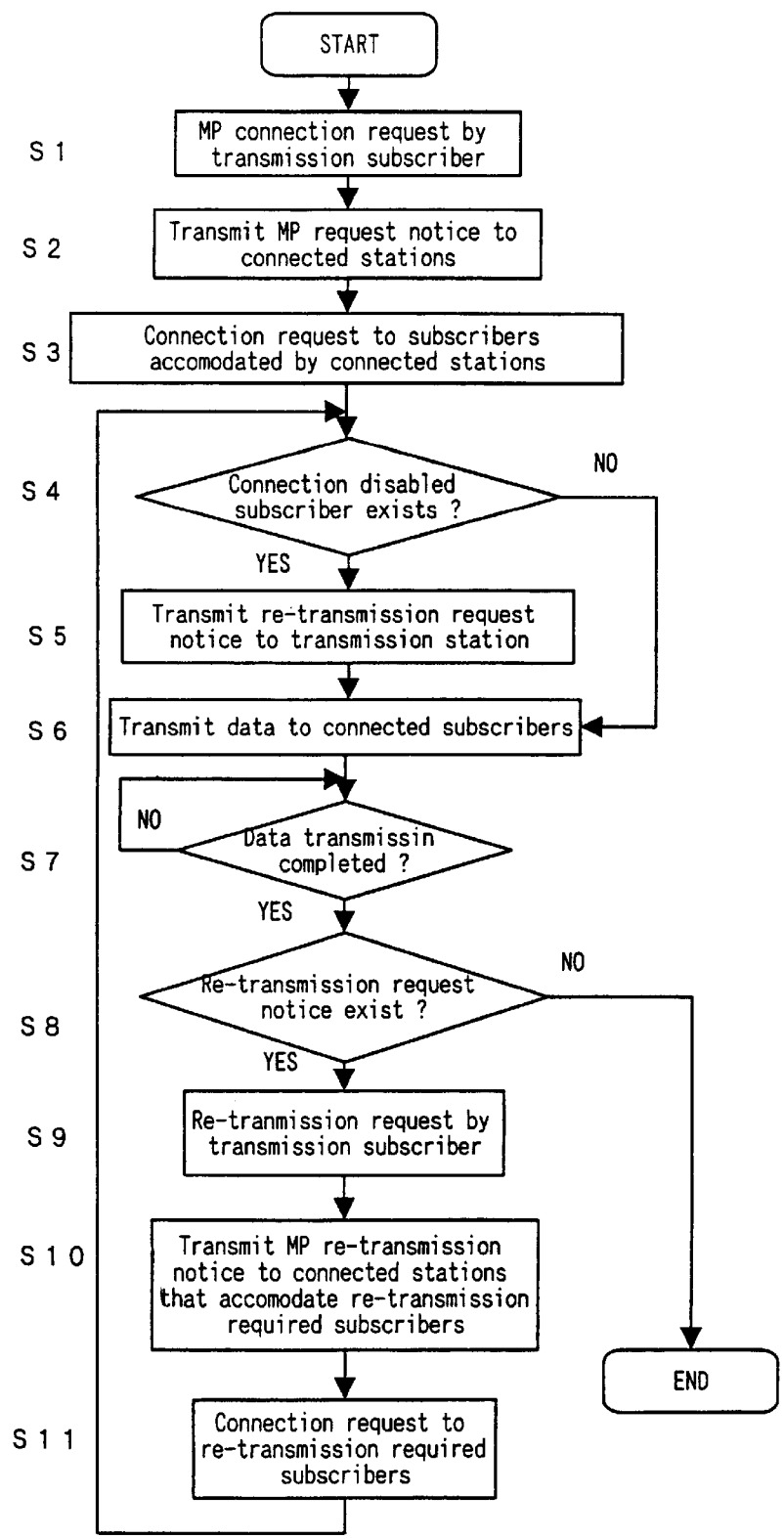
FIG. 1 is a flowchart of the basic multipoint connection processing, which is the re-connection process for the embodiment.

The preferred embodiments of the present invention will now be described. Note, however, that the technical scope of the present invention is not limited to these embodiments. For ease of understanding, the same reference numerals are used throughout to denote corresponding or identical components in the drawings.

A communication network system for a re-connection process in the following embodiments is a B-ISDN that employing ATM switches that enable multipoint connections. First, the basic multipoint connection processing, which is the re-connection process for the embodiment, will be described while referring to the flowchart in FIG. 1.

At step S1, a transmission subscriber, which desires to transmit data by using a multipoint (hereinafter referred to simply as an MP) connection, issues an MP connection request to a switch (a transmission station) that accommodates the subscriber. At step S2, the transmission station transmits multipoint connection request notice (hereinafter referred to as MP request notice) to individual switches (connected stations) that accommodate the subscribers for whom the MP connection is requested.

At step S3, based on the received MP connection data, the connected stations issues connection requests to the subscribers which are accommodated by these switches and form whom the MP connection is requested. At this time, because a bandwidth is insufficient, a line is busy or there is no response, there may be a subscriber with whom a connection can not be established. At step S4, the connected stations issue connection requests to their individual subscribers to detect subscribers with whom connections can not be established (connection disabled subscribers).

If a connection disabled subscriber is detected, at step S5, a connected station that accommodates that subscriber transmits a re-transmission request notice to the transmission station to request re-transmission of the data. The transmission subscriber is also notified of the fact that the re-transmission request has been issued.

At step S6, the transmission station transmits data to the subscribers with whom connections have been established (connected subscribers). When, at step S4, there is no connection disabled subscriber, the process at step S5 is not required.

When, at step S7, the transmission of data is completed, at step S8 the transmission subscriber confirms the existence/nonexistence of re-transmission request notices because he or she must re-transmit the data for the connection disabled subscribers which have not yet received the data. If there are such re-transmission request notices, at step S9 a data re-transmission request is issued to the transmission station.

Following this, at step S10, based on the re-transmission request notice, the transmission station transmits the MP re-transmission notice to a connected station that accommodates a subscriber for whom re-transmission of the data is required (re-transmission required subscriber). At step S11, the connected station that receives the MP request issues a connection request to the re-transmission required subscriber.

When, at step S8, there is no re-transmission request notice, it is assumed that the data have been transmitted to all the subscribers for whom the multipoint connection was established, and the multipoint connection process is thereafter terminated.

Figure 2:
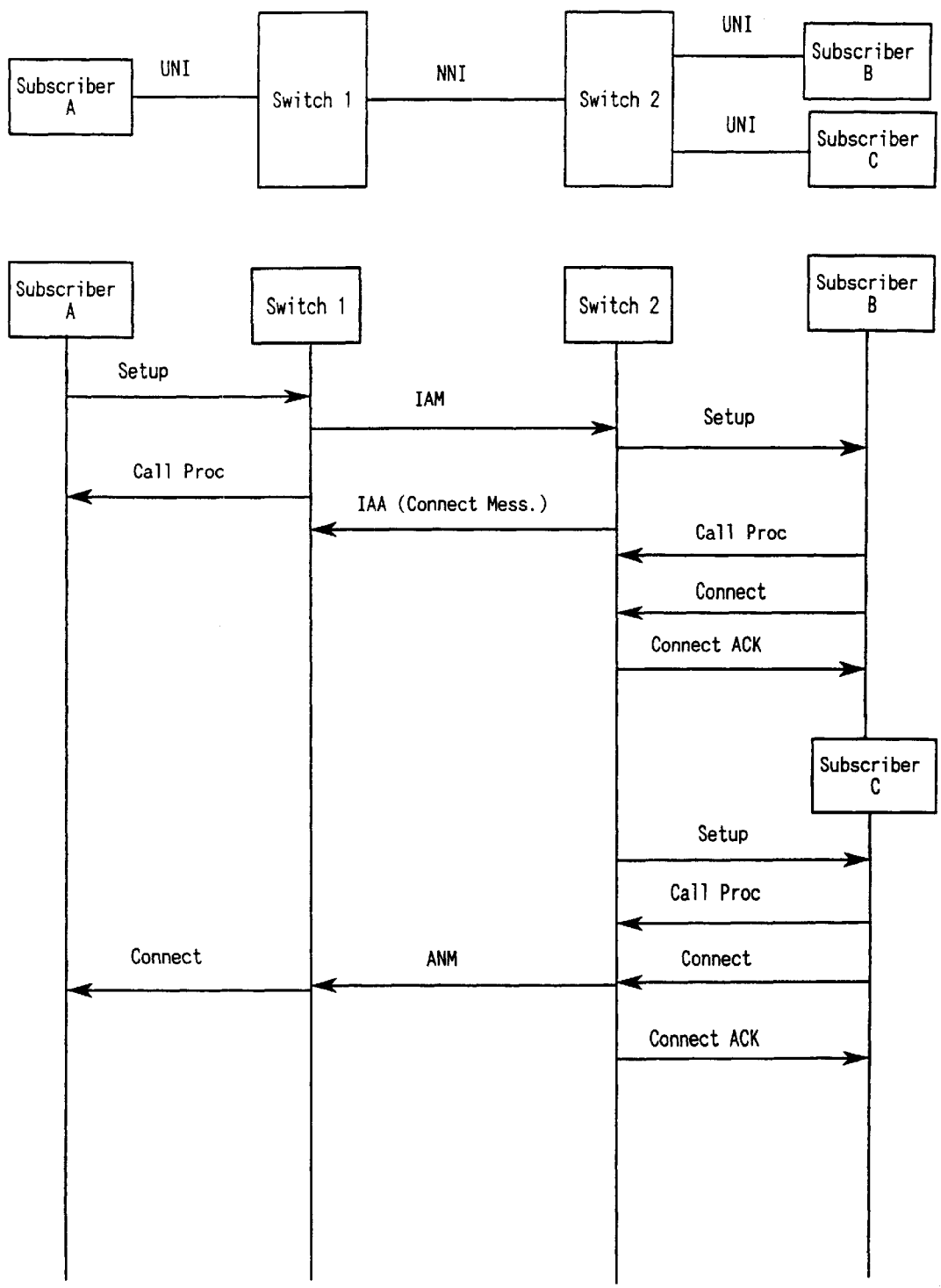
FIG. 2 is a diagram for explaining signals transmitted between subscribers and switches, and between the switches.

FIG. 2 is a diagram for explaining signals transmitted between subscribers and switches, and between the switches. As is shown in FIG. 2, a subscriber A is connected with a switch 1 via UNI (User Network Interface). Subscribers B and C are connected with a switch 2 via UNIs. The switches 1 and 2 are connected each other via an UNI (Network Network Interface). When subscriber A issues a multipoint connection request to subscribers B and C, first, subscriber A transmits to the switch 1 a call setup (Setup) signal for an MP connection request. Upon the receipt of this Setup signal, the switch 1 transmits an IAM (Initial Address Message) signal to the switch 2 to request the MP connection. The IAM signal includes the Setup information and information concerning the subscriber for whom the MP connection is requested.

Further, the switch 1 transmits to subscriber A a Call Proc signal indicating that the processing for the Setup signal from subscriber A is in progress.

The switch 2, which has received the IAM signal, first transmits the Setup signal to subscriber B, and then transmits to the switch 1 an IAA (Initial Address Acknowledgement Message) signal indicating that the IAM signal has been received. The IAA signal includes station information for the switch 2, which received the IAM signal. When subscriber B receives the Setup signal from the switch 2, subscriber B transmits to the switch 2 a Call Proc signal indicating that the Setup signal is being processed, and also a Connect signal which constitutes a response to the Setup signal received from the switch 2. Upon the receipt of the Connect signal, the switch 2 transmits to subscriber B a Connect ACK signal to confirm receipt of the response from subscriber B.

When the call setup for subscriber B is completed, the switch 2 transmits a Setup signal to subscriber C. Subscriber C, as well as subscriber B, transmits to the switch 2 a Call Proc signal and a Connect signal, and the switch 2 returns a Connect ACK signal to subscriber C.

In addition, when the switch 2 receives a Connect signal from all the subscribers for which the MP connection is requested, the switch 2 transmits to the switch 1 an ANM (Answer Message) signal indicating that the call setup has been completed for the subscribers for whom the MP connection is requested. When the switch 1 receives the ANM signal, it transmits to subscriber A a Connect signal, which is a call setup completion notification. When there is a connection disabled subscriber among those for whom the MP connection is requested, an ANM signal and a Connect signal, which is to be transmitted to subscriber A, include information concerning the connection disabled subscriber. In this manner, the call setup process is performed during the MP connection processing.

Figure 3:
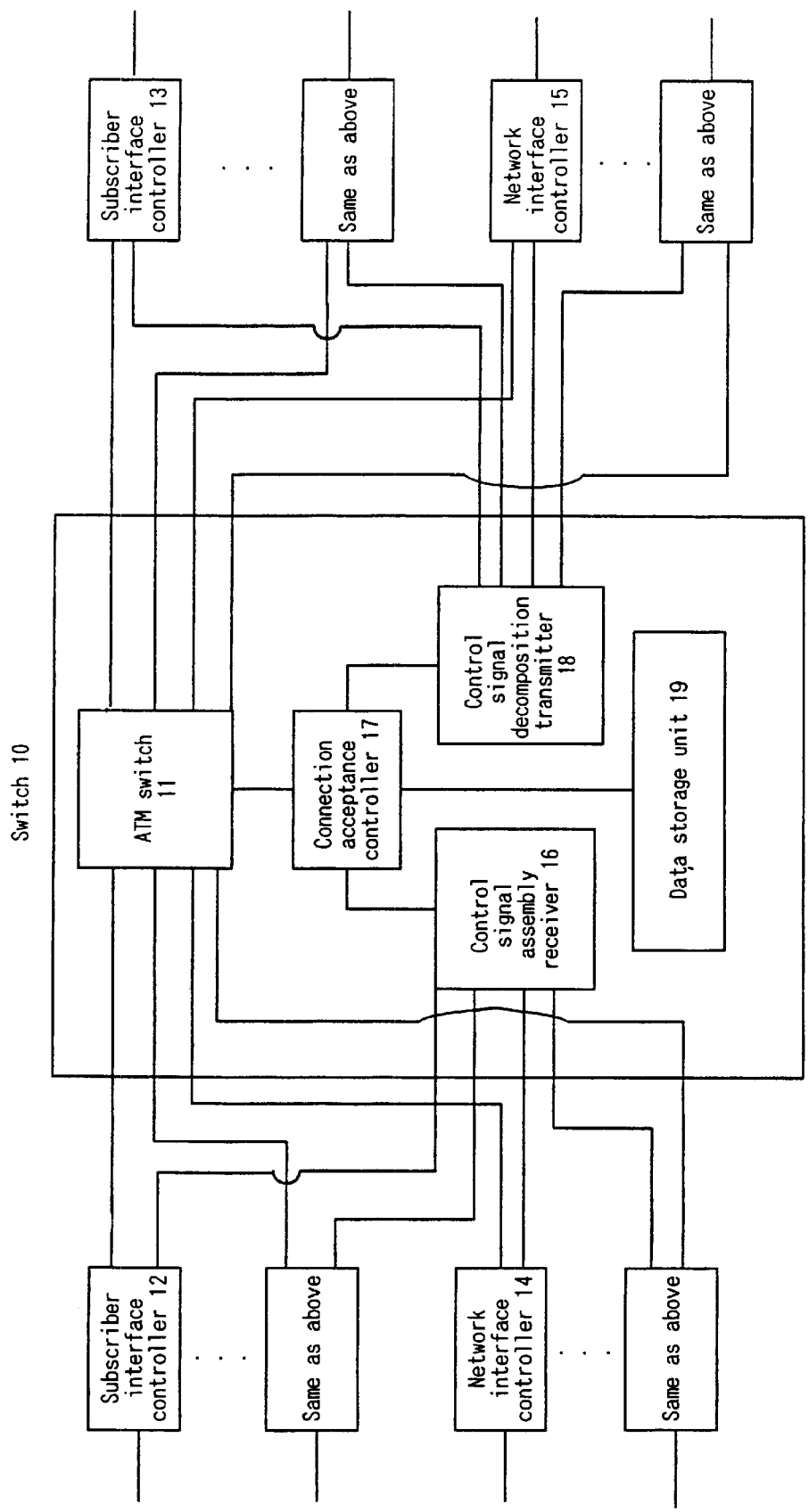
FIG. 3 is a functional block diagram for the switches.

FIG. 3 is a functional block diagram for the switches 1 and 2, which are ATM switches having an ATM switch 11 so as to enable the routing of an input data cell by using hardware switching. Signals transmitted by a subscriber are input to an input-side subscriber interface controller 12, and signals that are to be transmitted from the switch to a subscriber are output via an output-side subscriber interface controller 13. Signals to be transmitted between the switches are input/output respectively by an input-side network interface controller 14 and an output-side network interface controller 15.

When signals input to the interface controller 12 or 14 are, for example, control signals for call setups (including a multipoint connection request), as is shown in the flowcharts in FIGS. 4 and 6, which will be explained later, the control signals are output by the interface controller 13 or 15 via a control signal assembly receiver 16, a connection acceptance controller 17, and a control signal decomposition transmitter 18.

Figure 4:
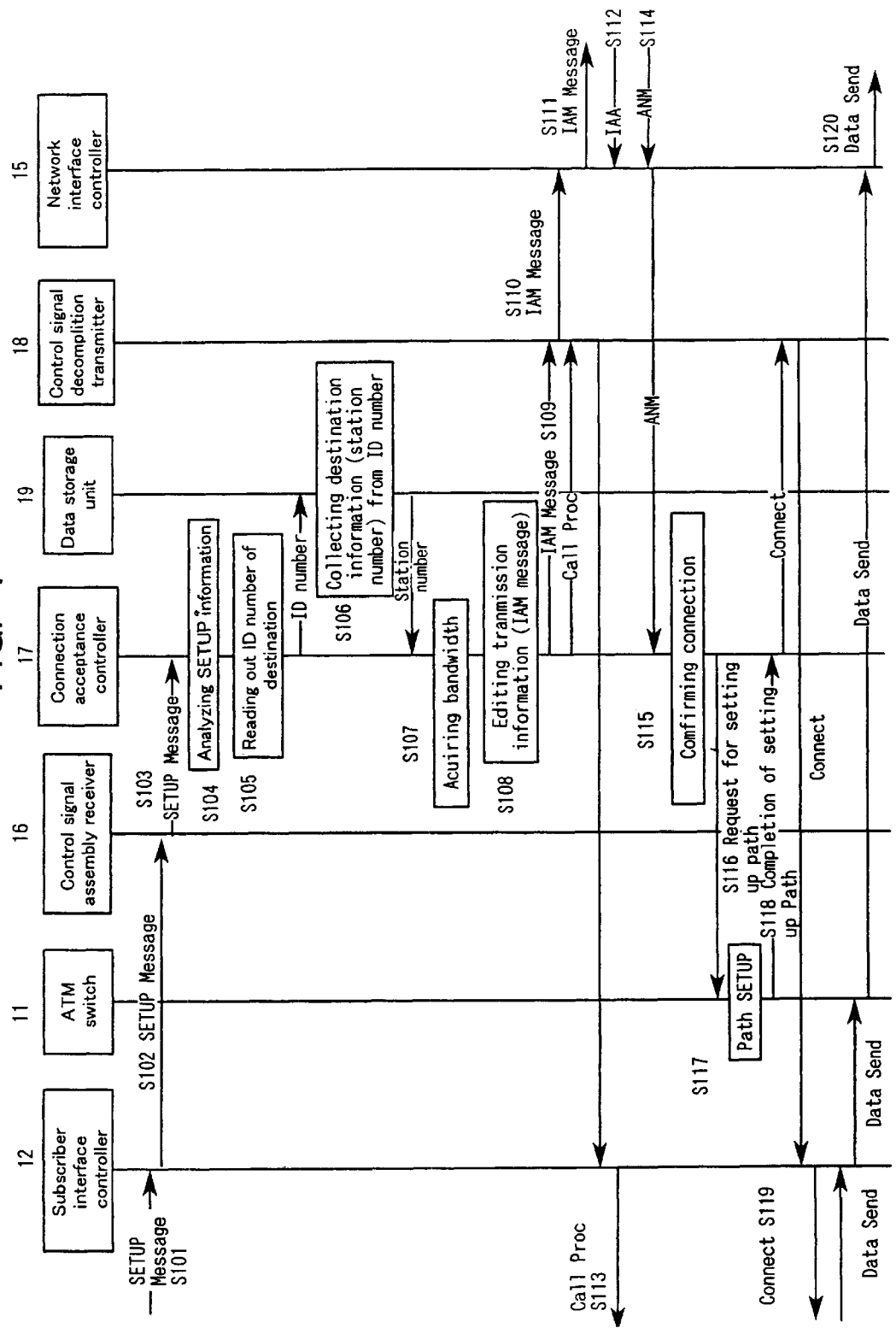
FIG. 4 is a flowchart for signal processing in the switch 1 in FIG. 2.

FIG. 4 is a flowchart for signal processing in the switch 1 in FIG. 2. A SETUP signal (Message) that includes a multipoint connection request from a transmission subscriber (subscriber A in FIG. 2) is input to the subscriber interface controller 12 (S101). A SETUP signal consisting of a plurality of cells is transmitted to the control signal assembly receiver 16 (S102), which in turn assembles the signals and transmits the result to the connection acceptance controller 17 (S103).

Figure 5:
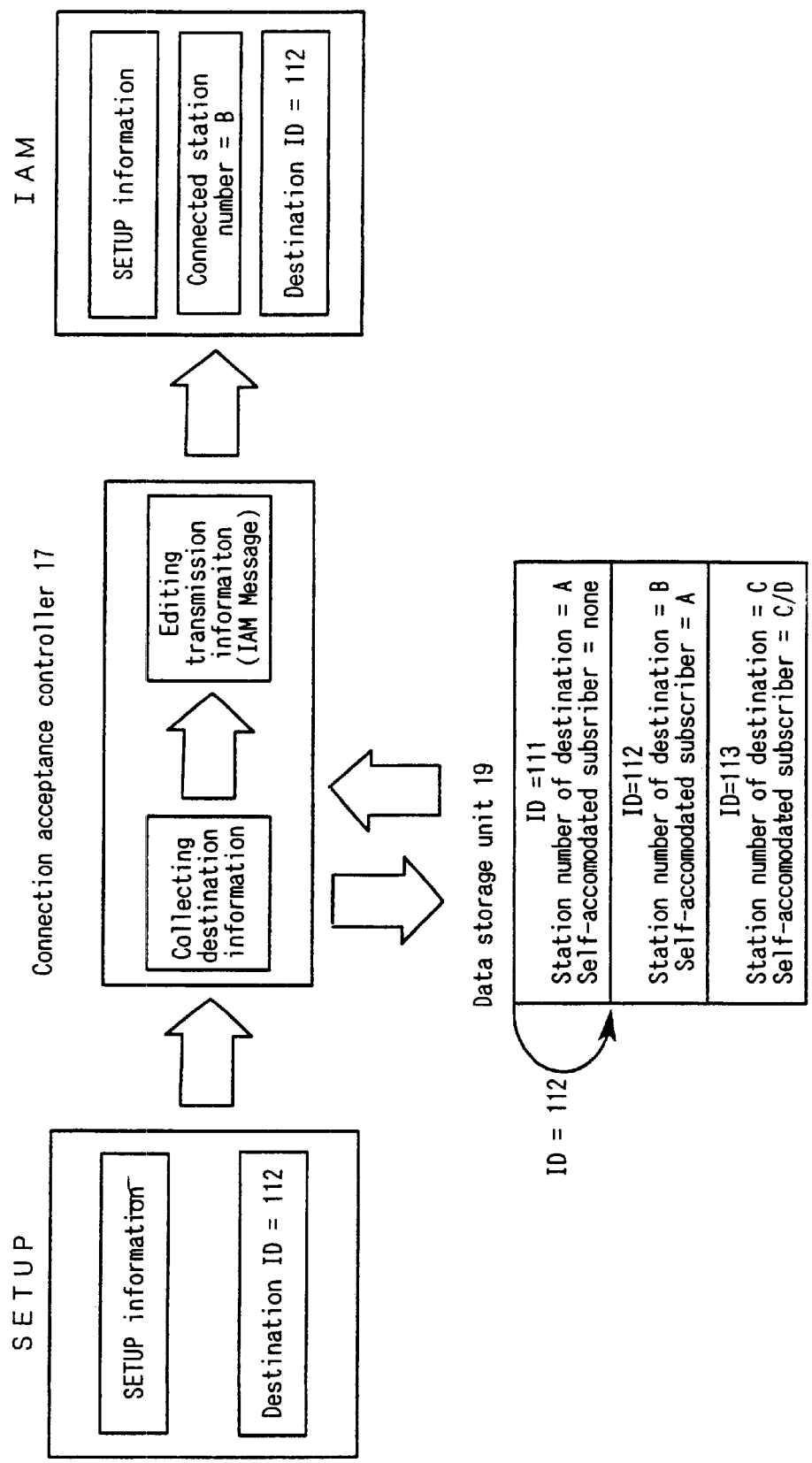
FIG. 5 is a diagram for explaining control signal processing performed by the connection acceptance unit 17 in FIG. 4.

FIG. 5 is a diagram for explaining control signal processing performed by the connection acceptance controller 17 in FIG. 4. The processing in FIG. 4 will be further explained while referring to FIG. 5. As is shown in FIG. 4, a SETUP Message(signal), which is to be transmitted to the connection acceptance controller 17, includes SETUP information and the ID number of a connection destination for which the MP connection is requested. The connection acceptance controller 17 analyzes the SETUP information (S104 in FIG. 4), and reads out the ID number of the connection destination (S105). In addition, the connection acceptance unit 17 collects from a data storage unit 19 in FIG. 3 a station number for a connected station (the switch 2 in FIG. 2) that corresponds to the ID number (S106). As is shown in FIG. 5, stored in data storage unit 19 are the numbers of the stations that correspond to the individual ID numbers and the numbers of the subscribers which are accommodated by the stations.

In FIG. 4, the connection acceptance controller 17 acquires a bandwidth for a transmission destination (S107), and edits an IAM signal (Message) that is to be transmitted to the station (the switch 2 in FIG. 2), which is connected with the connection acceptance controller 17 (S108). As is shown in FIG 5, the IAM signal also includes Setup information, the ID number of the destination, and the station number of the station. The IAM signal is transmitted to the signal decomposition transmitter 18 (S109), which then decomposes the signal to obtain a plurality of cells, and transmits the cells to the connected station via the network interface controller 15 (S110 and S111).

The network interface controller 15 receives an IAA message, which is a response signal for an IAM Message (S112). And a Call Proc signal, which is edited by the connection acceptance controller 17, is transmitted via the subscriber interface controller 12 to the transmission subscriber (S113).

In addition, as is described above, the network interface controller 15 receives an ANM signal from the connected station (the switch 2) (S114), and based on the ANM signal, the connection acceptance controller 17 confirms that connections have been established with all the subscribers for whom the MP connection is requested (S115).

The connection acceptance controller 17 forwards a request for the setting up of a path to the ATM switch 11 (S116), which in turn sets up the path (virtual path) (S117). When the path has been set up, the ATM switch 11 notifies the connection acceptance controller 17 that the setting up of the path has been completed (S118). Thereafter, the connection acceptance controller 17 transmits a Connect signal (Message) via the subscriber interface controller 12 to the transmission subscriber (S119). The call setup process is thereafter terminated, and the transmission subscriber initiates the transmission of data. The ATM switch 11 is employed to perform the routing for the data received by the subscriber interface controller 12, and the data are transmitted via the network interface controller 15 to the individual connected stations (S120).

Figure 6:
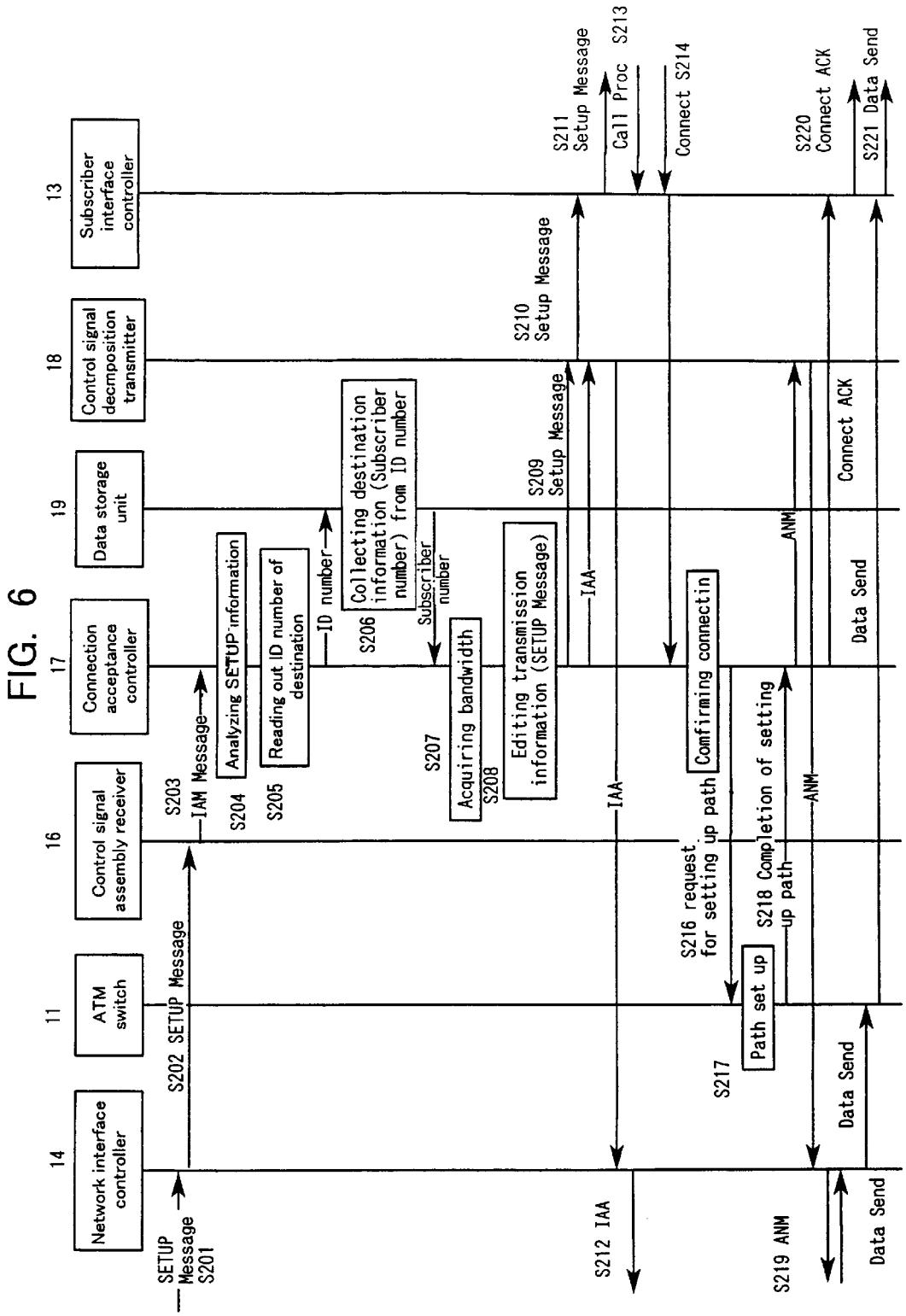
FIG. 6 is a flowchart for signal processing in the switch 2 in FIG. 2.

FIG. 6 is a flowchart showing the signal processing performed by the switch 2 in FIG. 2. First, the IAM signal (Message) is transmitted by a transmission station (the switch 1) to the network interface controller 14 (S201). The IAM signal, as well as the others described above, is assembled by the control signal assembly receiver 16 (S202), and the resultant signal is transmitted to the connection acceptance controller 17 (S203).

Figure 7:
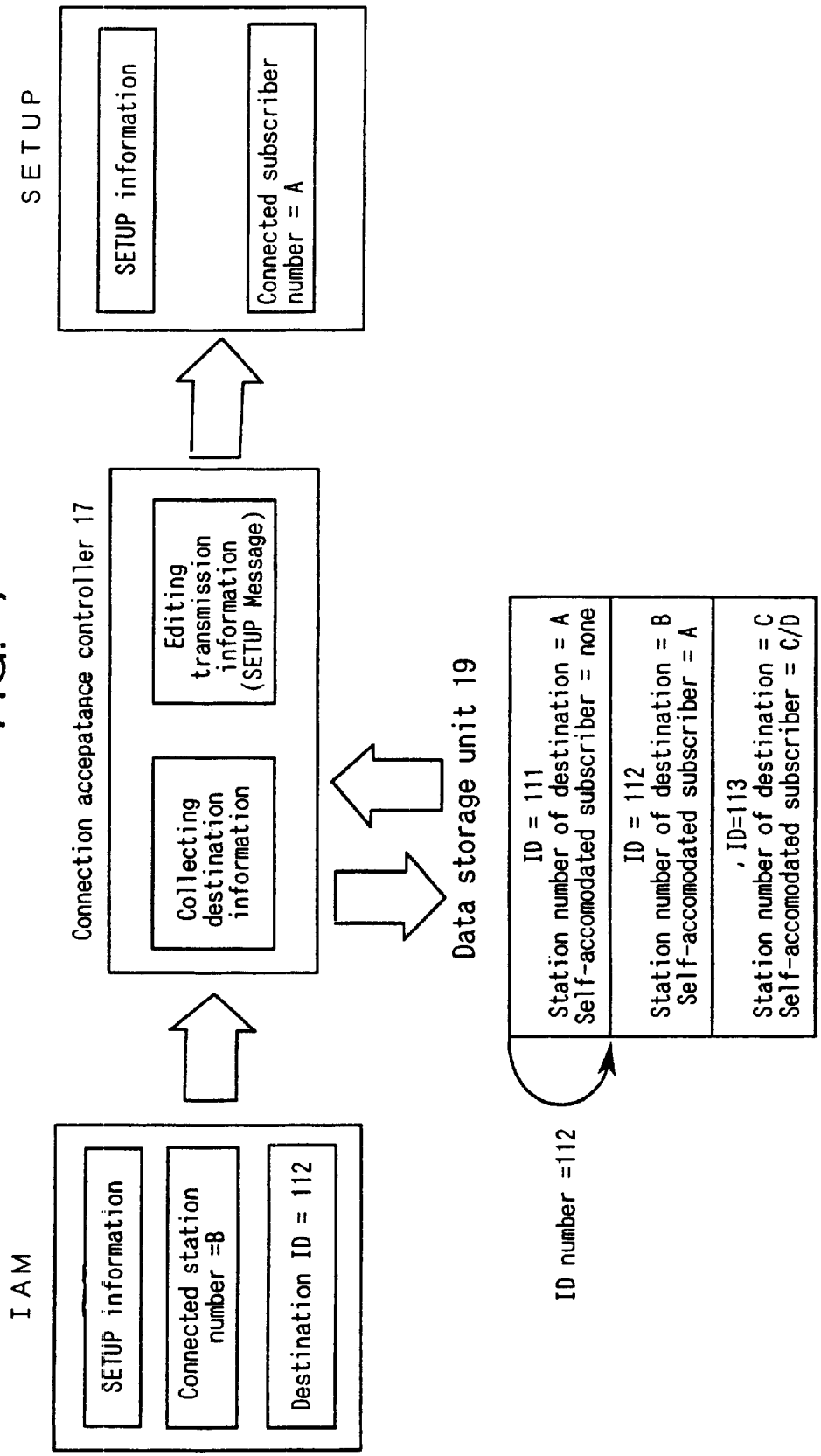
FIG. 7 is a diagram for explaining control signal processing performed by the connection acceptance unit 17 in FIG. 6.

FIG. 7 is a diagram for explaining control signal processing performed by the connection acceptance controller 17 in FIG. 6. The processing in FIG. 6 will be further explained while referring to FIG. 7. As is shown in FIG. 7, the IAM signal to be transmitted to the connection acceptance controller 17 includes the Setup information, the ID number of the connection destination and the station number of the connected station, as is described above. The connection acceptance controller 17 analyzes the Setup information included in the IAM signal (S204), and reads the ID number (S205). In addition, the connection acceptance controller 17 captures from a data storage unit 19 in FIG. 3 a connected subscriber number that corresponds to the ID number (S206). As well as the above, as is shown in FIG. 7, stored in data storage unit 19 are the numbers of stations that correspond to the individual ID numbers and the numbers of subscribers which are accommodated by the stations.

In FIG. 4, the connection acceptance controller 17 acquires a band for a transmission destination (S207), and edits a Setup signal (Message), which is a control signal to be transmitted to the subscriber by whom the multipoint connection is required (S208). As is shown in FIG, 7, the Setup signal includes the Setup information and the numbers of the subscribers. The Setup signal is transmitted to the signal decomposition transmitter 18 (S209), which in turn decomposes the signal into a plurality of cells, and transmits the cells to the subscribers via the network interface controller 13 (S210 and S211). In addition, the connection acceptance controller 17 transmits an IAA signal to the transmission station (switch 1) via the network interface controller 14 (S212).

The subscriber interface controller 13 receives a Call Proc signal from the individual subscribers (S213) and also receives a Connect signal (S214). Connect signals transmitted by the subscribers are sequentially transmitted to the connection acceptance controller 17. When the connection acceptance controller 17 confirms that connections have been established with all the subscribers for whom the MP connection is requested (S215), it requests that a path be set up (S216) and the ATM switch 11 sets up a pat (virtual path) (S217). When the path has been set up, the ATM switch 11 notifies the connection acceptance controller 17 that the setting up of the path has been completed(S218). Then, the connection acceptance controller 17 transmits an ANM signal via the network interface controller 14 to the transmission station (S219) and a Connect ACK signal to a subscriber which has transmitted a Connect signal (S220). The call setup process is thereafter terminated and the transmission station initiates the transmission of data. The ATM switch 11 is employed to perform the routing for the data received by the network interface controller 14, and then the data are transmitted via the subscriber interface controller 13 to the individual subscribers (S221).

The preferred embodiments of the present invention referred to in the flowchart in FIG. 1 will be more specifically described.

[First Embodiment]

FIGS. 8 to 12 are diagrams for explaining a first embodiment of the present invention. In FIG. 8, a transmission subscriber a-Sub issue a request to a transmission station (station A) for an MP connection that corresponds to predetermined ID data, which is used to identify a subscriber that requests an MP connection (corresponds to step S1 in FIG. 1).

Station A acquires information concerning subscribers, for which an MP connection is requested, which corresponds to the ID data. Specifically, the individual switches (stations) have their own databases, in each of which are stored multipath connection information (hereinafter referred to as MPC information), which includes information that concerns a subscriber corresponding to the ID data and information that concerns a connected station by which the subscriber is accommodated; and a re-transmission request table, in which are entered information for subscribers and information for connected stations corresponding to re-transmission request data, which will be described later.

Therefore, upon the receipt of the ID data, station A accesses MPC information F11 in the database, and acquires subscriber information and connected station information which corresponds to the ID data. In this embodiment, the connected station information and the subscriber information, which corresponds to the predetermined ID data, are for subscribers b-Sub and c-Sub which are accommodated by station B, as is shown in MPC information F11 in FIG. 8.

In FIG. 9, station A employs the acquired subscriber data to transmit the MP request notice F12 to station B (corresponds to step 2 in FIG. 1). The MP request notice F12 to be transmitted include information concerning the subscribers b-Sub and c-Sub. Station B employs the subscriber information included in the received MP request notice F12 to issue a connection request to the subscribers b-Sub and c-Sub (corresponds to step S3 in FIG. 1). Then, the transmission subscriber a-Sub transmits data to the connected subscribers (corresponds to step S6 in FIG. 1).

At this time, as is shown in FIG. 10, if, due to insufficient bandwidth or to the line being busy, a connection is not established with one subscriber b-Sub for whom the MP connection is requested, the data from the transmission subscriber a-Sub can not be transmitted to the subscriber b-Sub. Station B then determines whether or not there is such a connection disabled subscriber (corresponds to step S4 in FIG. 1). If there is a connection disabled subscriber, station B transmits re-transmission request notice F13 to station A (corresponds to step S5 in FIG. 1). The re-transmission request notice F13 include information concerning the connection disabled subscriber b-Sub. Though not shown, the re-transmission request notice F13 are also transmitted to the transmission subscriber a-Sub.

Figure 11:
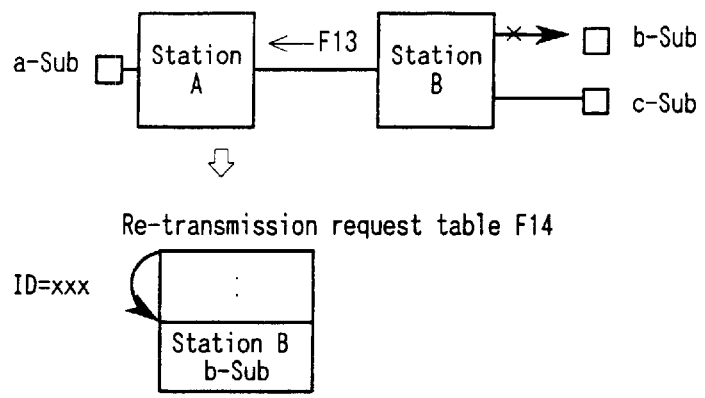

Following this, as is shown in FIG. 11, upon the receipt of the re-transmission request notice F13, station A examines a re-transmission request table F14 in an internally managed database, and captures, in accordance with the ID data, information concerning the subscriber included in the re-transmission request notice F13.

Figure 12:
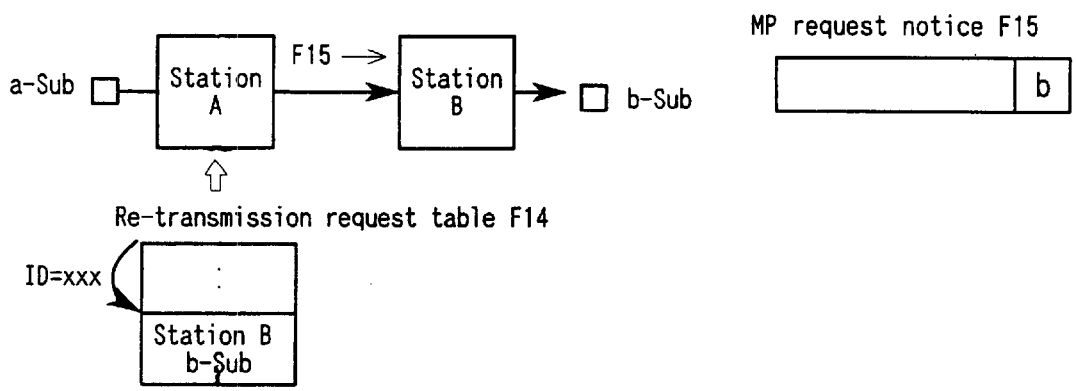

When the transmission of data is terminated (corresponds to step S7 in FIG. 1), and when there is a connection disabled subscriber which did not receive data (corresponds to step S8), the transmission subscriber a-Sub issues a re-transmission request concerning the ID data to station A (corresponds to step S9 in FIG. 1). Then, as is shown in FIG. 12, upon the receipt of the re-transmission request, station A searches the re-transmission request table F14 in the database for information concerning the subscriber which needs the re-transmission of the data (re-transmission required subscriber). In this embodiment, the re-transmission required subscriber is the subscriber b-Sub, as is described above. Station A transmits to station B MP request notice F15, including the information concerning the subscriber b-Sub (corresponds to step S10 in FIG. 1).

Station B, which receives the MP request notice F15, issues a connection request to the subscriber b-Sub (corresponding to step S11 in FIG. 1). When the connection with the subscriber b-Sub is established, data are transmitted to the subscriber b-Sub. If the connection is not disabled, the above processing is repeated.

As is described above, in the first embodiment, when connections with all the subscribers for whom an MP connection is requested are not established, first, data are transmitted to connected subscribers, and when a re-transmission request is issued after transmission of the data is terminated, an MP connection request is re-issued to the connection disabled subscriber. Therefore, it is possible to prevent data transmission delays, which are caused by the waiting of data transmission until all the subscribers for whom MP connections are requested can be connected. In addition, since in response to the re-issuance of an MP connection request, the MP connection is requested only for the connection disabled subscriber, the transmission of data is not performed for the subscribers which have already received the data, so that efficient data transmission can be provided.

[Second Embodiment]

Figure 13:
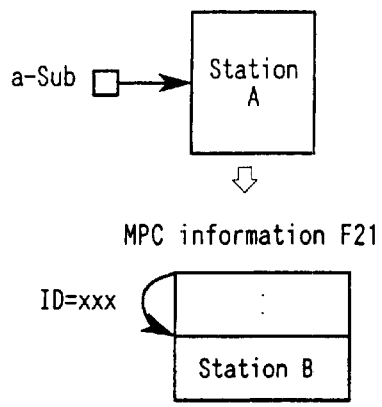
FIGS. 13 to 20 are diagrams for explaining a second embodiment of the present invention.

FIGS. 13 to 20 are diagrams for explaining a second embodiment of the present invention. In FIG. 13, a transmission subscriber a-Sub issues to a station A a request for an MP connection that corresponds to predetermined ID data (corresponds to step S1 in FIG. 1). Upon the receipt of the ID data, station A accesses MPC information F21 in the database, and acquires connected station information that corresponds to the ID data. In this embodiment, the connected station information that corresponds to the predetermined ID data is for station B, for example.

Figure 14:
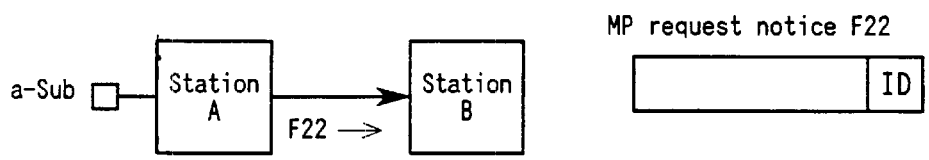
Figure 15:
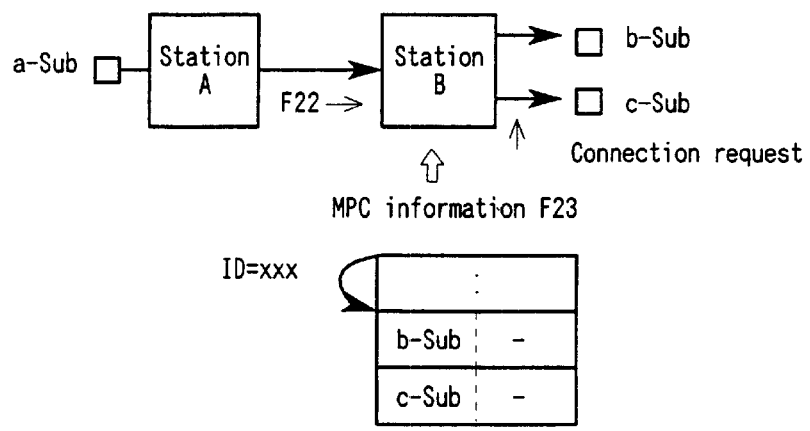

In FIG. 14, station A employs the acquired subscriber data to transmit the MP request notice F22 to station B (corresponds to step 2 of FIG. 1). The MP request notice F22 to be transmitted include the ID information. As is shown in FIG. 15, based on the ID information included in the received MP request notice F22, station B acquires information for the subscribers b-Sub and c-Sub from the MPC information F23, which is stored in the database managed by station B, and issues a connection request to the subscribers b-Sub and c-Sub (corresponds to step S3 in FIG. 1). Then, the transmission subscriber a-Sub transmits data to the connected subscribers (corresponds to step S6 in FIG. 1).

Figure 16:
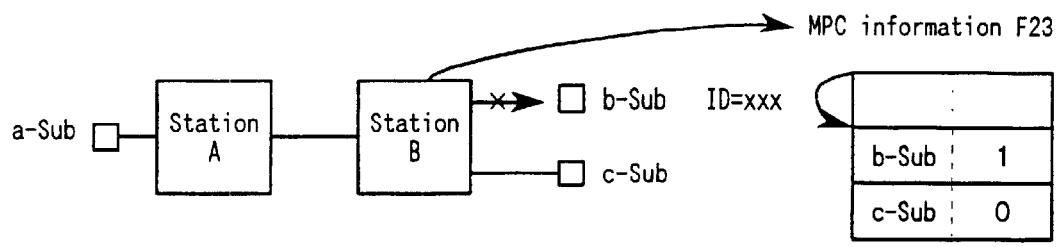

As is shown in FIG. 16, station B ascertains whether a connection has been established with the subscriber for which a connection is requested (corresponds to step S4 in FIG. 1), and enters the results in the MPC information F23 in the database managed by station B. Specifically, as is shown in FIG. 16, assume that the MP connection with the subscriber c-Sub, one of those for whom the MP connection is requested, is established, and that the connection with the subscriber s-Sub, for whom the MP connection is also requested, is not established due to insufficient bandwidth or to the line being busy. In this case, flag information for each subscriber is recorded in the subscriber information included in the MPC information F23, with a flag value of '0' being recorded when a connection is established, and a flag value of '1' being recorded when a connection is not established.

Figure 17:
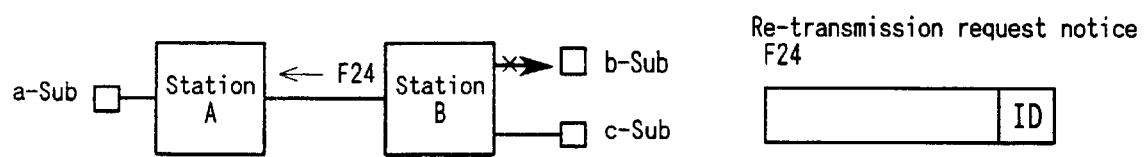

Then, as is shown in FIG. 17, station B transmits, to station A, re-transmission request notice F24, including the ID data (corresponds to step S5 in FIG. 1). In addition, though not shown, the re-transmission request notice F24 are also transmitted to the transmission subscriber a-Sub.

Figure 18:
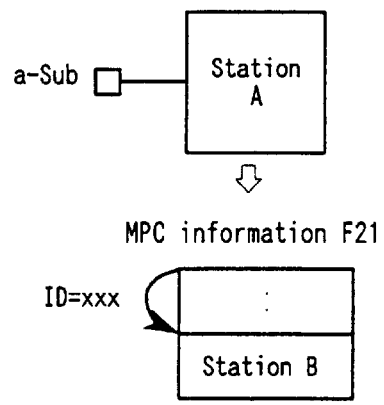
Figure 19:
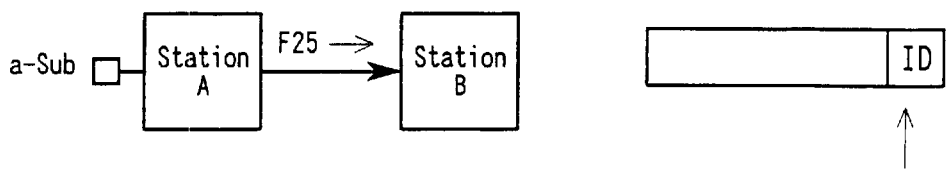

When the transmission of data is terminated (corresponds to step S7 in FIG. 1), and when there is a connection disabled subscriber which did not receive data (corresponds to step S8), as is shown in FIG. 18, the transmission subscriber a-Sub issues a re-transmission request concerning the ID data to station A (corresponds to step S9 in FIG. 1). Then, upon the receipt of the re-transmission request, station A acquires the information concerning station B from the MPC information F21. Following this, as is shown in FIG. 19, based on the obtained connected station information, station A transmits to station B MP re-transmission notice F25, including the ID information (corresponds to step S10 in FIG. 1).

Figure 20:
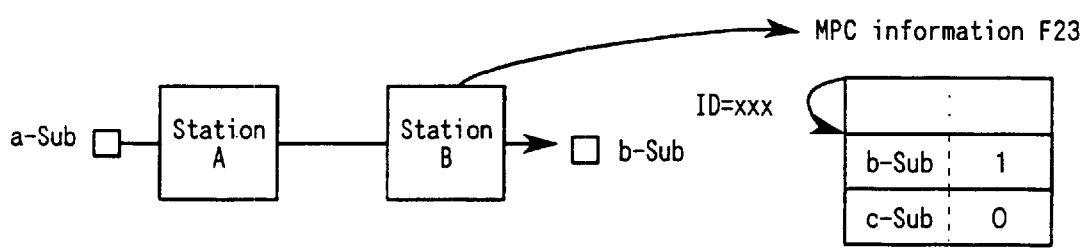

As is shown in FIG. 20, station B, which receives the MP re-transmission notice F25, accesses MPC information F23 in the database managed by station B. And in accordance with the above flag information, the information for a subscriber for whom re-transmission of data is required, i.e., information for the subscriber b-Sub, is obtained from the subscriber information corresponding to the ID data. Station B then issues a connection request to the re-transmission required subscriber b-Sub (corresponds to step S11 in FIG. 1). When the connection with the re-transmission required subscriber b-Sub is established, data are transmitted to the subscriber b-Sub. If the connection is not disabled, the above processing is repeated.

As is described above, in this embodiment, as well as in the first embodiment, data transmission delays can be prevented and the re-transmission of data is performed efficiently.

[Third Embodiment]

Figure 21:
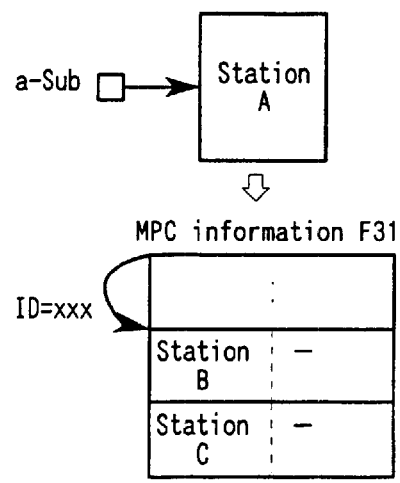
FIGS. 21 to 28 are diagrams for explaining a third embodiment of the present invention.

FIGS. 21 to 28 are diagrams for explaining a third embodiment of the present invention. In FIG. 21, a transmission subscriber a-Sub issues to station A a request for an MP connection that corresponds to predetermined ID data (corresponds to step S1 in FIG. 1). Upon the receipt of the ID data, station A accesses MPC information F31 in the database, and acquires connected station information that corresponds to the ID data. In this embodiment, the connected station information that corresponds to the predetermined ID data is for stations B and C, for example.

Figure 22:
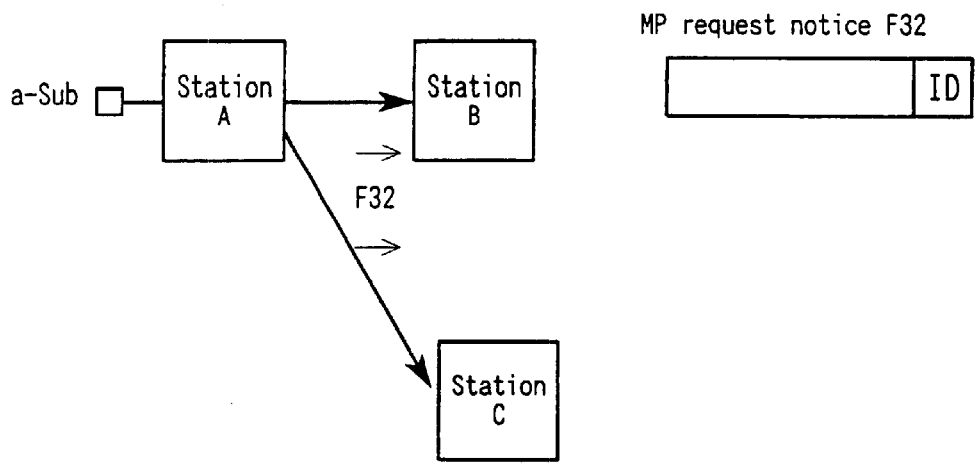
Figure 23:
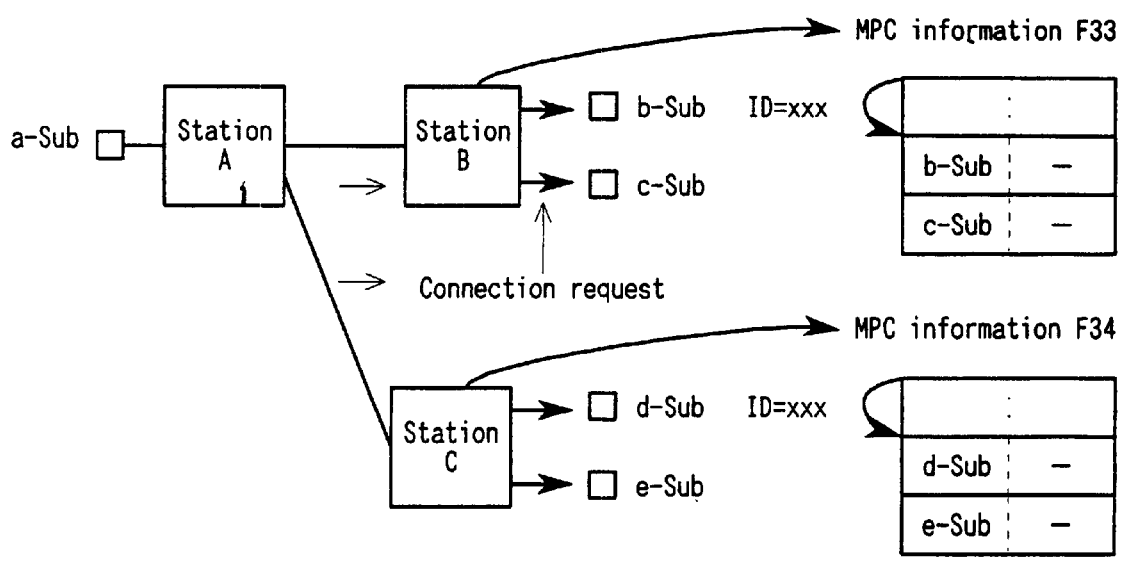

In FIG. 22, station A employs the acquired subscriber data to transmit the MP request notice F32 to the stations B and C (corresponds to step 2 in FIG. 1). The MP request notice F32 to be transmitted includes the ID data. As is shown in FIG. 23, based on the ID data included in the received MP request notice F32, station B acquires information for the subscribers b-Sub and c-Sub from MPC information data F33, which is stored in the database managed by station B, while the station C acquires information for the subscribers d-Sub and e-Sub from MPC information F34, which is stored in the database managed by the station C. Then, the stations B and C issue a connection request to these subscribers (corresponds to step S3 in FIG. 1), and the transmission subscriber a-Sub transmits data to the connected subscribers (corresponds to step S6 in FIG. 1).

Figure 24:
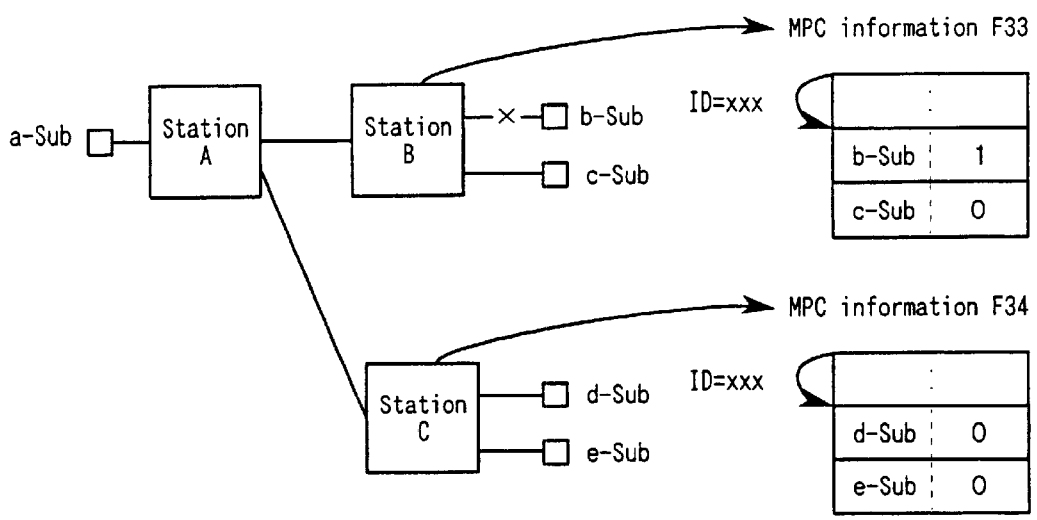

As is shown in FIG. 24, the stations B and C ascertain whether connections have been established with the subscribers for which connections are requested (corresponds to step S4 in FIG. 1), and enter the results in the MPC information F33 and F34 in their separate databases. The flag information for each subscriber is recorded in the subscriber information included in the MPC information F33 and F34, with a flag value of '0' being recorded when a connection is established, and a flag value of '1' being recorded when a connection is not established.

Specifically, as is shown in FIG. 24, assume that, for station B, the MP connection with the subscriber c-Sub, one of those for whom an MP connection is requested, has been established and that the connection with the subscriber b-Sub, for whom an MP connection is also requested, has not been established due to insufficient bandwidth or to the line being busy. And assume that, for the station C, the MP connections with both of the subscribers d-Sub and e-Sub, for whom the MP connections are requested, have been established. In this case, the flag information for the subscriber b-Sub is '1', and the flag information for each of the other subscribers is '0'.

Figure 25:
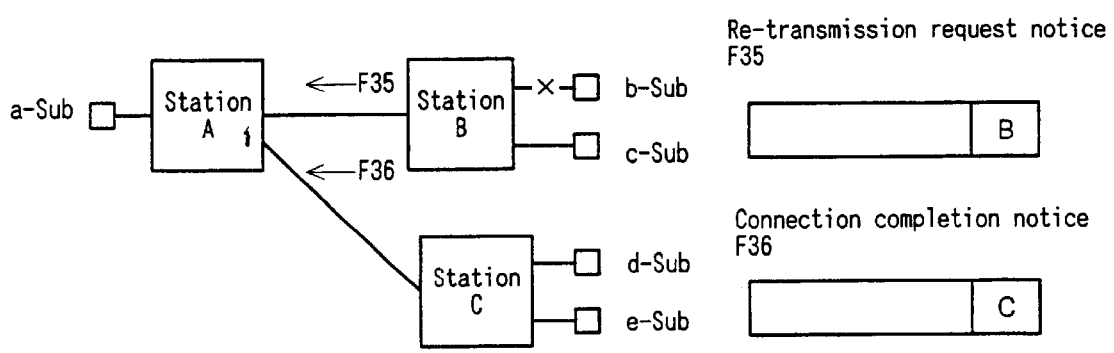

Then as is shown in FIG. 25, station B, which accommodates the connection disabled subscriber, transmits to station A re-transmission request notice F35, including the ID data (corresponds to step S5 in FIG. 1). The station C, which can establish connections with all the subscribers that it accommodates, transmits to station A connection completion notice F36, including the ID data. In addition, through not shown, the re-transmission request notice F35 are also transmitted to the transmission subscriber a-Sub.

Figure 26:
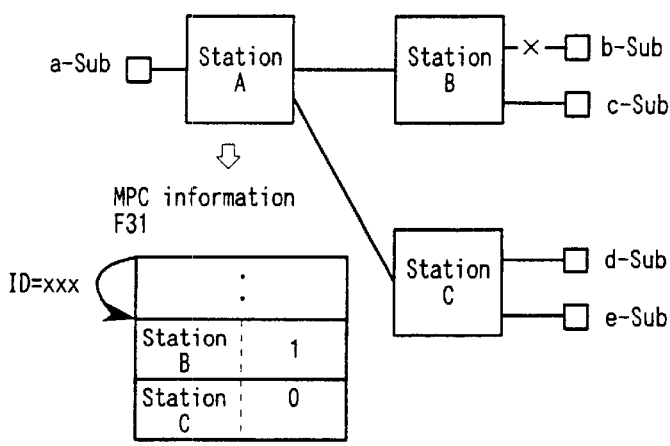

Upon receipt of the re-transmission request notice F35 and the connection completion notice F36, station A accesses the MPC information F31 in the database which it manages, as is shown in FIG. 26. For the connected station data included in the MPC information F31, a flag value of '1' is recorded for a station for which data re-transmission is required, and a flag value of '0' is recorded for a station for which data re-transmission in accordance with the connected station is not required.

Figure 27:
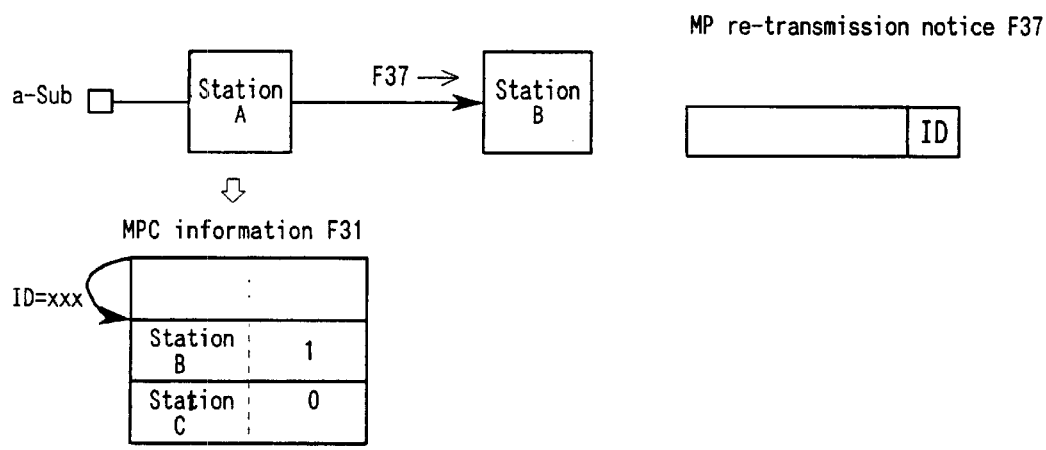

When the transmission of data is terminated (corresponds to step S7 in FIG. 1), and when there is a connection disabled subscriber which did not receive data (corresponds to step S8), as is shown in FIG. 27, the transmission subscriber a-Sub issues a re-transmission request concerning the ID data to station A (corresponds to step S9 in FIG. 1). Then, upon the receipt of the re-transmission request, station A acquires, from the MPC information F31, the information concerning the connected station B that requires a data re-transmission. Station A then transmits to the connected station B MP re-transmission notice F37, including the ID information (corresponds to step S10 in FIG. 1).

Figure 28:
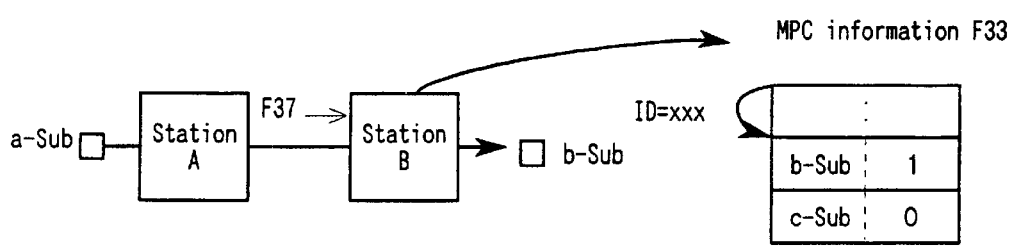

As is shown in FIG. 28, station B, which receives the MP re-transmission notice F37, accesses MPC information F33 in the database that it manages. And in accordance with the above flag information, the information for a subscriber for whom re-transmission of data is required, i.e., information for the subscriber b-Sub, is obtained from among the information concerning the subscribers corresponding to the ID data. Station B then issues a connection request to the subscriber b-Sub (corresponds to step S11 in FIG. 1). When the connection with the subscriber b-Sub is established, data are transmitted to the subscriber b-Sub. If the connection is not disabled, the above processing is repeated.

As is described above, in this embodiment as well as in the first and the second embodiment, data transmission delays can be prevented and the re-transmission of data is efficient. In addition, in the third embodiment, when the switch (station) has established connections with all the subscribers for whom the MP connection is requested, it transmits the connection completion notification to the transmission station. Thus, the transmission station can identity a connection disabled subscriber, i.e., a switch (station) that accommodates a subscriber for whom re-transmission of data is required, and can transmit re-transmission notification data only to such a station. As a result, a more efficient re-connection process can be provided.

[Fourth Embodiment]

Figure 30:
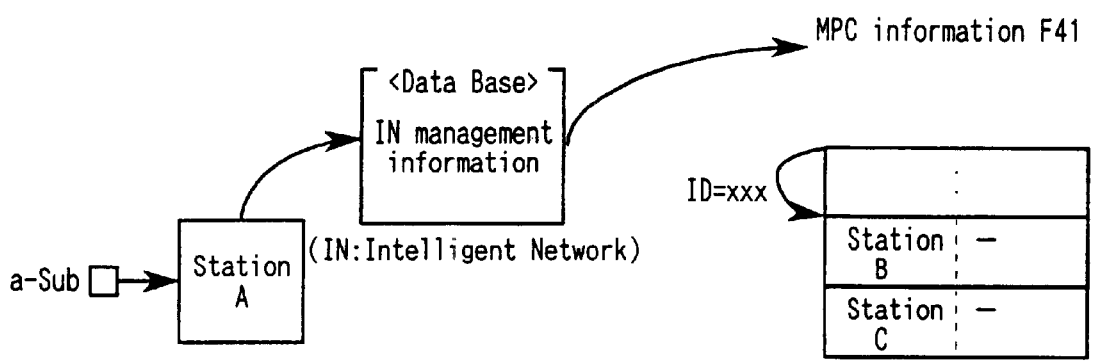
FIGS. 30 to 38 are diagrams for explaining a forth embodiment of the present invention.

FIGS. 30 to 38 are diagrams for explaining a fourth embodiment of the present invention. In FIG. 30, a transmission subscriber a-Sub issues to a station A a request for an AMP connection that corresponds to predetermined ID data (corresponds to step S1 in FIG. 1). Upon the receipt of the ID data, station A accesses IN management data, which is a database belonging to a host computer IN (Intelligent Network) which manages a communication network systems, and acquires connected station information that corresponds to the ID data. In this embodiment, the connected station information F41, which are MPC information that correspond to the predetermined ID data, are those for stations B and C, for example. Furthermore, the IN management database controls the databases that are controlled by the individual switches (stations) in the above embodiments.

Figure 29:
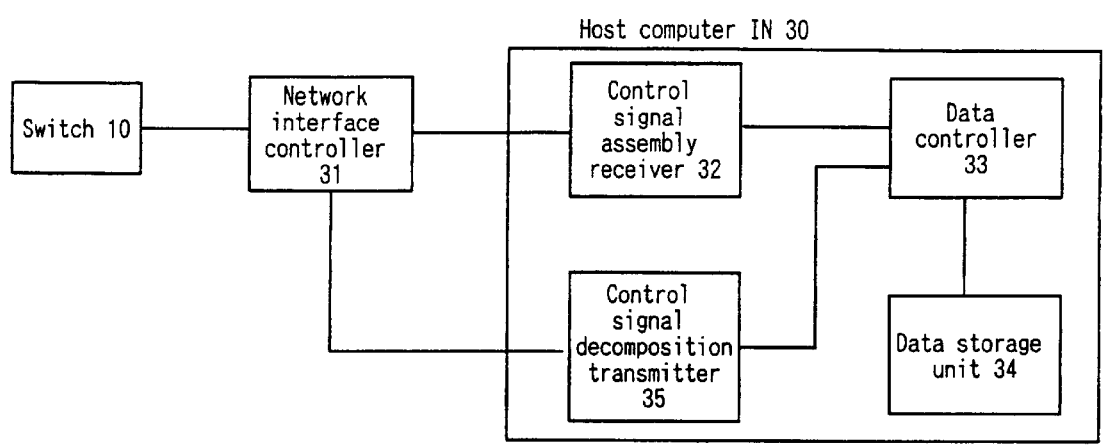
FIG. 29 is a block diagram illustrating the arrangement of a host computer IN 30.

FIG. 29 is a block diagram illustrating the arrangement of a host computer IN30. In FIG. 29, via a network interface controller 31, an access signal is transmitted by a switch 10 to a control signal assembly receiver 32 as a plurality of ATM cells. The access signal is assembled by the control signal assembly receiver 32, and the result is transmitted to a data controller 33. In accordance with the received access signal, the data controller 33 acquires predetermined data from a data storage unit 34, which is a database for managing IN management data. Acquired, for example, are MP connection data which correspond to ID data included in the access signal. The data controller 33 also stores information included in the access signal in the data storage unit 34. For example, stored is information as to whether a connection is established for a connected station to which an MP connection request is issued, and as to whether a connection with a subscriber has been established. The data controller 33 transmits, to a control signal decomposition transmitter 35, a response signal that carries information obtained from the data storage unit 34. The control signal decomposition transmitter 35 decomposes the response signal into ATM cells, which are transmitted to the switch 10 via the network interface controller 31.

Figure 31:
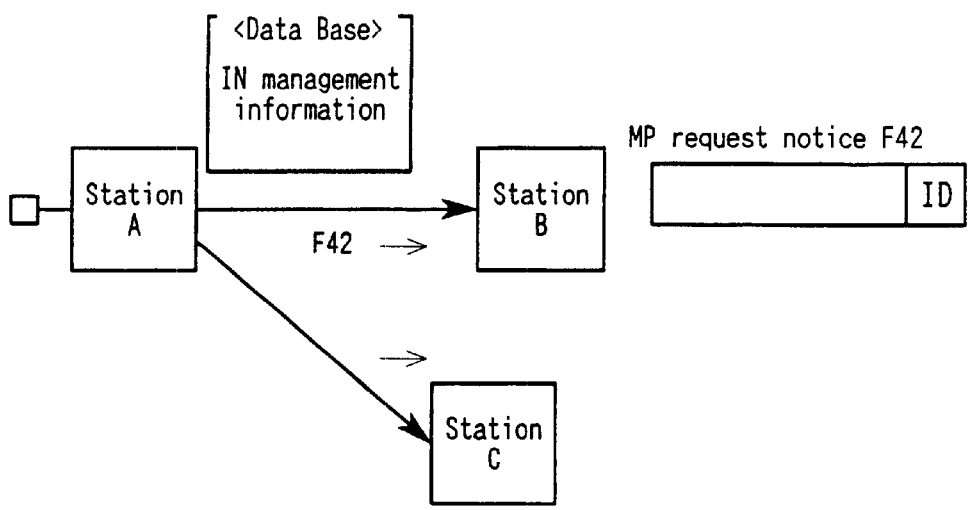
Figure 32:
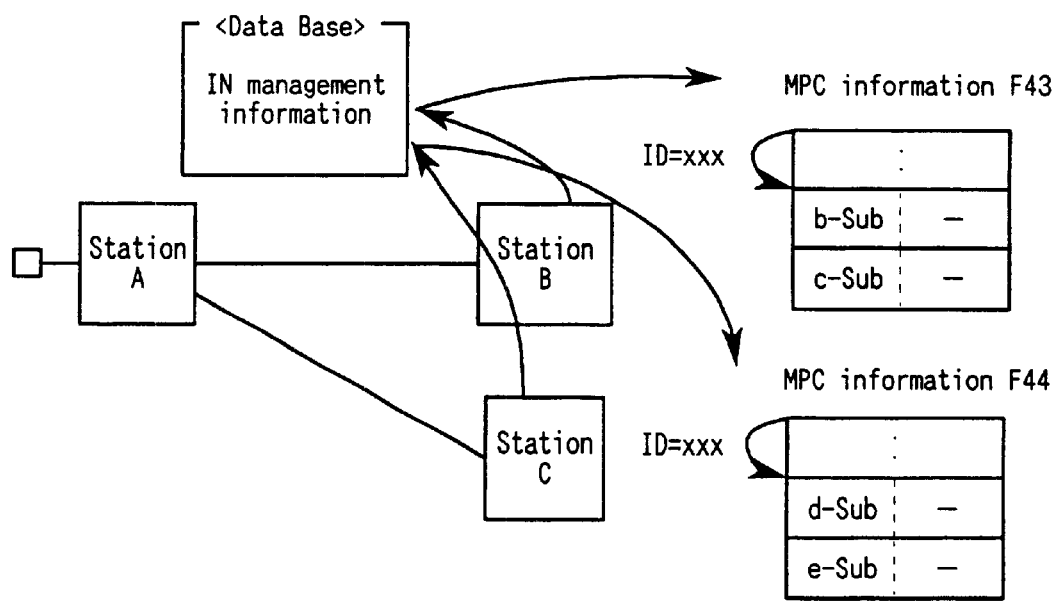
Figure 33:
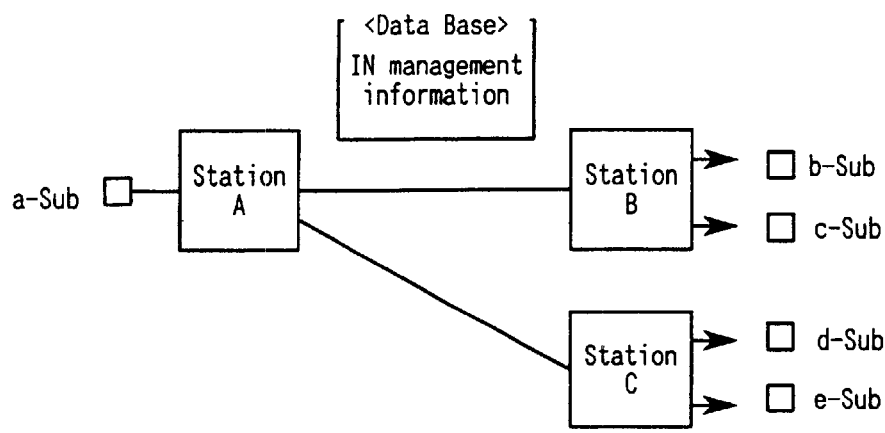

In FIG. 31, station A employs the subscriber data acquired in FIG. 30 to transmit the MP request notice F42 to the stations B and C (corresponds to step 2 in FIG. 1). The MP request notice F42 to be transmitted include the ID data. As is shown in FIG. 32, based on the ID data included in the received MP request notice F42, the stations B and C access the IN management database, and acquire, respectively, information for the subscribers b-Sub and c-Sub from MPC information F43 for station B, and information for the subscribers d-Sub and e-Sub from MPC information F44 for the station C. Then, as is shown in FIG. 33, the stations B and C issue a connection request to these subscribers (corresponding to step S3 in FIG. 1), and the transmission subscriber a-Sub transmits data to the connected subscribers (corresponding to step S6 in FIG. 1).

Figure 34:
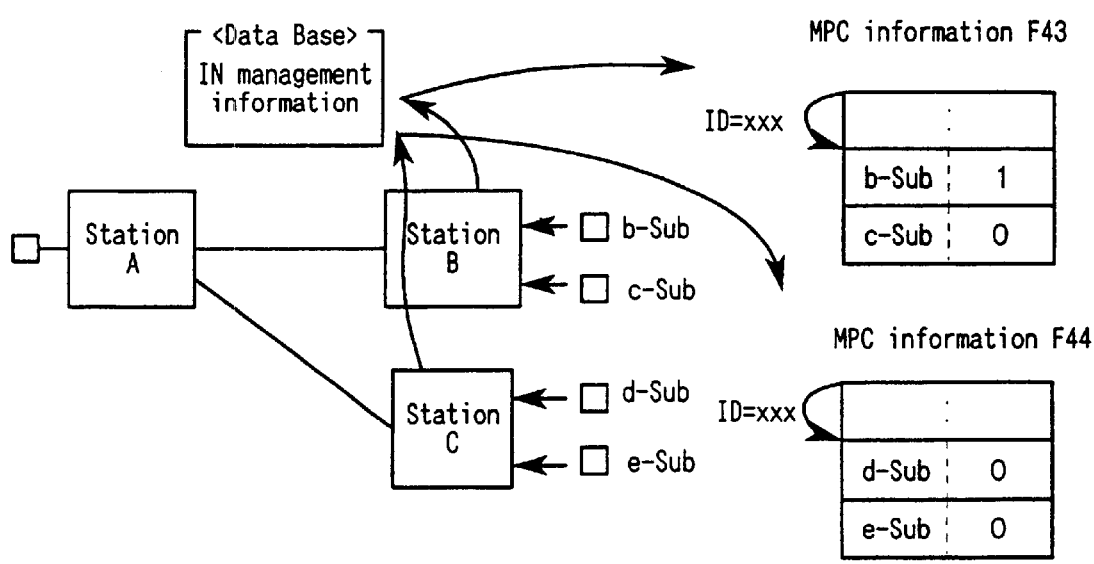

As is shown in FIG. 34, the stations B and C ascertain whether connections with the subscribers for which a connection is requested are established (corresponds to step S4 in FIG. 1), and enter the results in the MPC information F43 and F44 for stations B and C, which are stored in the IN management database. Specifically, the flag information for each subscriber is recorded in the subscriber information included in the MPC information F43 and F44; with a flag value of '0' being recorded when a connection is established, and a flag value of '1' being recorded when a connection is not established.

For example, as is shown in FIG. 34, assume that, for station B, the MP connection with the subscriber c-Sub, one of those that is requested for an MP connection, is established and that the connection with the subscriber b-Sub, for whom the MP connection is also requested, is not established due to insufficient bandwidth or to the line being busy. And assume that, for the station C, the MP connection with both of the subscribers d-Sub and e-Sub, for whom the MP connection is requested, is established. In this case, flag information for the subscriber b-Sub is '1', and flat information for the other subscribers is '0'.

Figure 35:
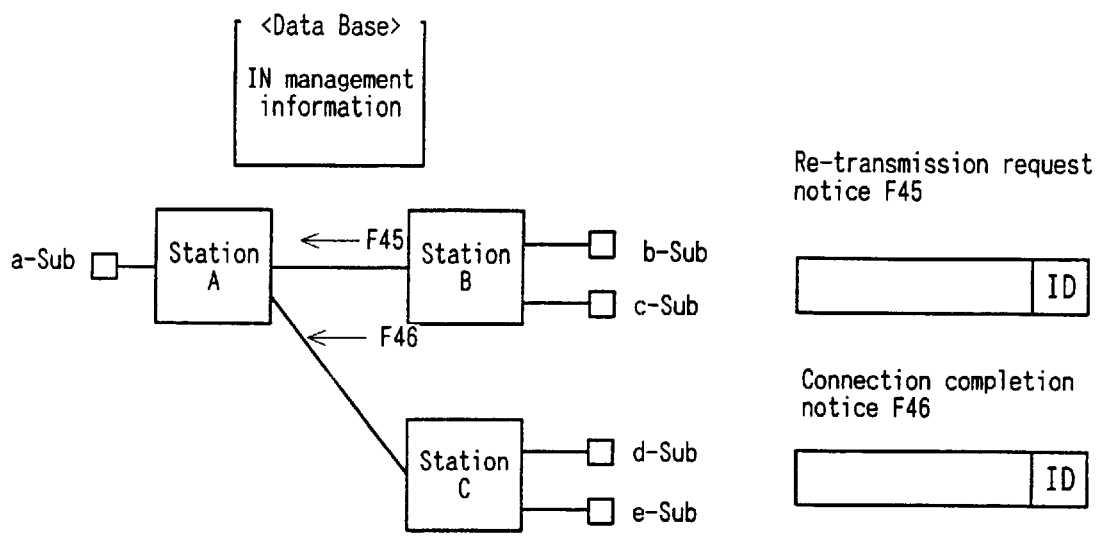

Then, as is shown in FIG. 35, station B, which accommodates the connection disabled subscriber, transmits to station A re-transmission request notice F45, including the ID data (corresponds to step S5 in FIG. 1). The station C, which can establish connections with all the subscribers that is accommodates, transmits to station A connection completion notice F46, including the ID data. In addition, though not shown, the re-transmission request notice F45 are also transmitted to the transmission subscriber a-Sub.

Figure 36:
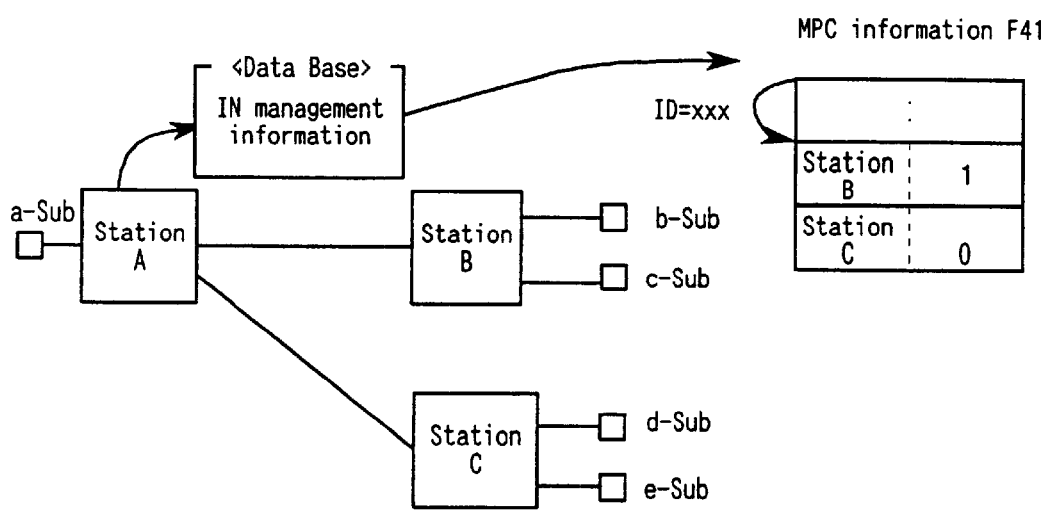

Upon receipt of the re-transmission request notice F45 and the connection completion notice F46, station A accesses the IN management database, as is shown in FIG. 36. For the connection station data included in the MPC information F41 for station A in the database, in accordance with the connected station, a flag value of '1' is recorded for a station for which data re-transmission is required, and a flag value of '0' is recorded for a station for which data re-transmission is not required.

Figure 37:
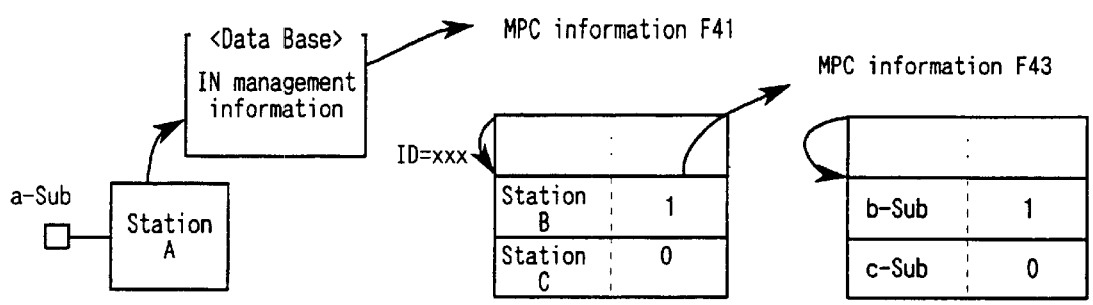

When the transmission of data is terminated (corresponds to step S7 in FIG. 1), and when there is a connection disabled subscriber which did not receive data (corresponds to step S8), as is shown in FIG. 37, the transmission subscriber a-Sub issues a re-transmission request concerning the ID data to station A (corresponds to step S9 in FIG. 1). Then, upon the receipt of the re-transmission request, station A transmits the ID data to the IN management database, and requests information concerning a subscriber for which re-transmission is required from the IN management database. Based on the ID data, the IN management database acquires, from the MPC information F41 for station A, information concerning the connected station B for which re-transmission of data is required. The IN management database also acquires, from the MPC information F43 for station B, information concerning a subscriber for whom the re-transmission is required, i.e., information for the subscriber b-Sub, and transmits it to station A.

Figure 38:
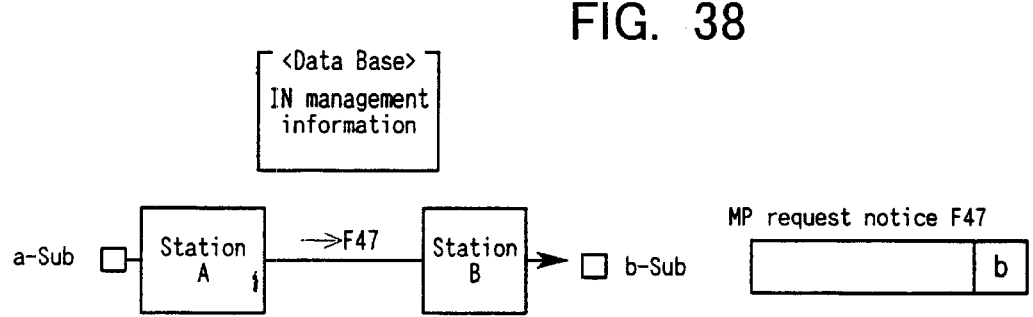

When station A receives the information concerning the subscriber for whom the re-transmission is required, as is shown in FIG. 38, station A transmits to station B MP request notice F47, which includes information for the subscriber b-Sub (corresponds to step S10). Then, station B issues a connection request to the subscriber b-Sub (corresponds to step S11 in FIG. 1). When the connection with the subscriber b-Sub is established, data are transmitted to the subscriber b-Sub. If the connection is not disabled, the above processing is repeated.

Figure 39:
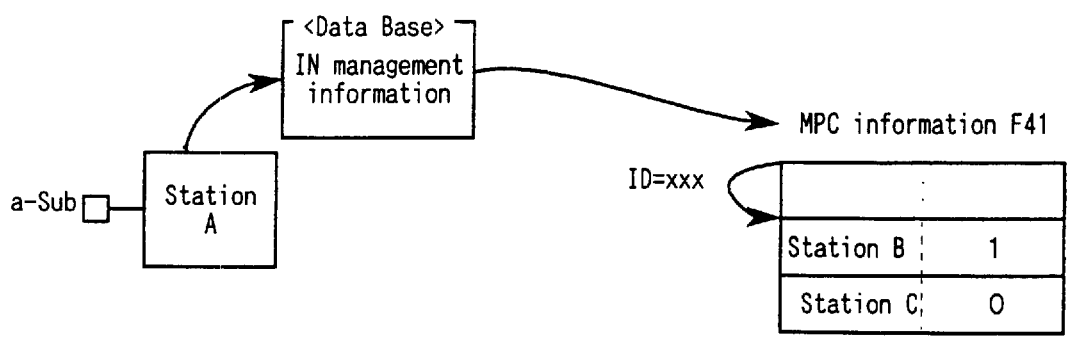
FIGS. 39 to 41 are diagrams for explaining a modification of the forth embodiment.
Figure 40:
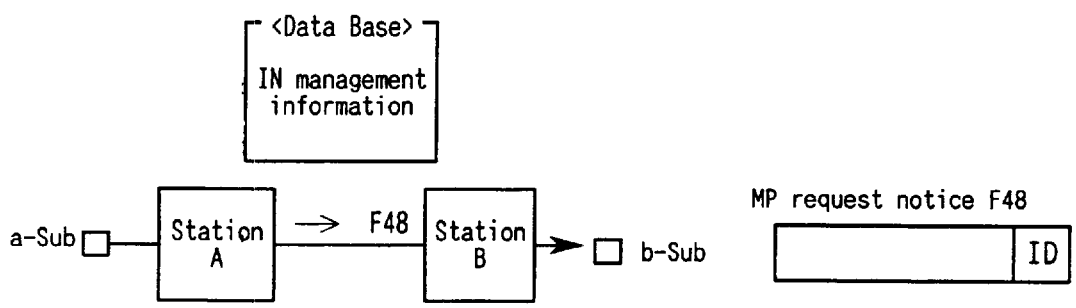
Figure 41:
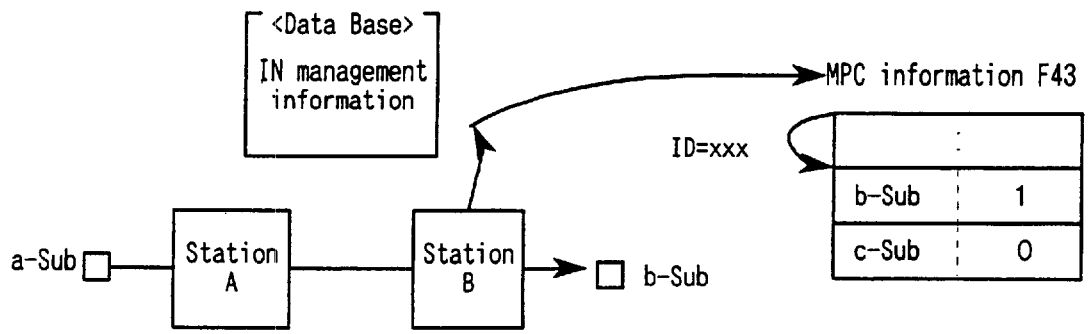
Figure 42:
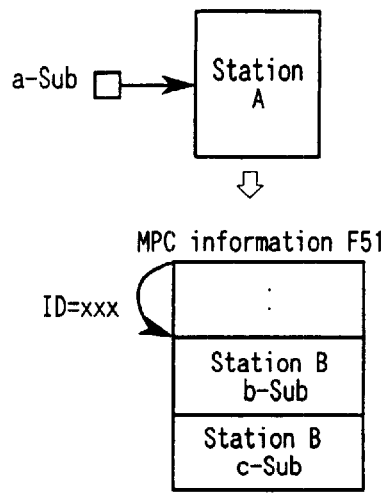
FIGS. 42 to 47 are diagrams for explaining a fifth embodiment of the present invention.

FIGS. 39 to 41 are diagrams for explaining a modification of the fourth embodiment. Since an explanation for this modification that would be given while referring to FIGS. 30 to 36 would be the same as that given for the fourth embodiment, no further explanation for that portion will be given. In FIG. 39, the transmission subscriber a-Sub issues a re-transmission request concerning the ID data to station A (corresponds to step S9 in FIG. 1). Then, station A transmits the ID data to the IN management database, and asks the IN management database for information according a subscriber for which re-transmission is required. Based on the ID data, the IN management database acquires, from the MPC information F41 for station A, information concerning the connection station B for which re-transmission of data is required, and transmits it to station A.

When station A receives the information concerning the connected station at which the re-transmission is required, while in the fourth embodiment, station A transmits to station B MP request notice F48, which includes the ID, as is shown in FIG. 40 (corresponds to step S10). Furthermore, as is shown in FIG. 41, upon the receipt of the MP request notice F48, station B accesses the IN management database and acquires, from the MPC information F43 for station B, the information concerning the subscriber b-Sub for whom the re-transmission is required. Then, station B issues a connection request to the subscriber b-Sub (corresponds to step S11 in FIG. 1). When the connection with the subscriber b-Sub has been established, data are transmitted to the subscriber b-Sub. If the connection is not disabled, the above processing is repeated.

As is described above, in this modification as well as in the first through the fourth embodiments, data transmission delays can be prevented and the re-transmission of data is efficient. In addition, in this modification as well as in the third embodiment, the transmission station can identity a connection disabled subscriber, i.e., a switch (station) that accommodates a subscriber for whom re-transmission of data is required, and can selectively transmit re-transmission notification data only to such a station. As a result, a more efficient re-connection process can be provided.

Further, in the fourth embodiment, if the sets of subscriber data included in the MP request notice F47 in FIG. 38 should exceed the limit for data sets included in one MP request notice F47, the MP request notice F47 must be transmitted many times, and an extended period of time will be required for a re-connection process.

In the modification of the fourth embodiment, however, as is shown in FIG. 40, since MP request notice F48 including ID data are transmitted, the above described problem can be eliminated. However, the connected station that receives the MP request notice F48 will require a period of time to access the IN management database, and a comparatively long period of time will be required for a re-connection process.

Therefore, it is preferable that if at a single connected there are many subscribers for whom connections were not established, the modification of the fourth embodiment be selected, and that if there are only a few such subscribers, the fourth embodiment be selected. Specifically, at the time of an MP re-connection, the host computer IN on the communication network employs the IN management database to count, for each connected station, the number of subscribers for whom connections were not established. Then, in accordance with the number of such subscribers, the host computer IN selects the re-connection processing performed in either the fourth embodiment or in the modification. That is, the host computer IN selects the re-connection process in the fourth embodiment when a small count is obtained, and selects the re-connection process in the modification of the fourth embodiment when a large count is obtained. The selected re-transmission processing is thereafter initiated.

[Fifth Embodiment]

FIGS. 42 to 47 are diagrams for explaining a fifth embodiment of the present invention. In this embodiment, correspondence with the flowchart in FIG. 1 is not provided. As well as in the four embodiments, in FIG. 42, a transmission subscriber a-Sub issues to a transmission station (station A) a request for an MP connection that corresponds to predetermined ID data, which is used to identify a subscriber that requests an MP connection.

Upon the receipt of the ID data, station A accesses MPC information F51 in the database that it manages, and acquires information for an MP connection concerning requested subscribers and connected station information, both information items corresponding to the ID data. In this embodiment, the connected station information and the subscriber information, which correspond to the predetermined ID data, are for subscribers b-Sub and c-Sub that are accommodated by station B, as is shown in the MPC information F51 in FIG. 36.

Figure 43:
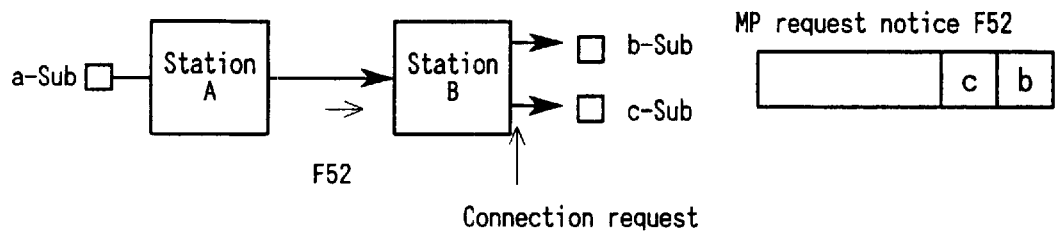
Figure 44:
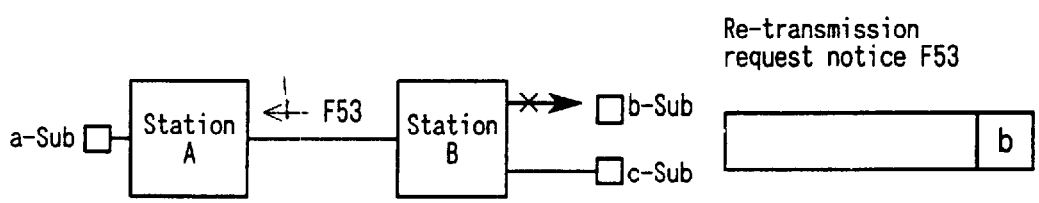

In FIG. 43, station A employs the acquired subscriber data to transmit the MP request notice F52 to station B. The MP request notice F52 to be transmitted includes information for the subscribers b-Sub and c-Sub. Station B employs the subscriber information included in the received MP request notice F52 to issue a connection request to the subscribers b-Sub and c-Sub. Then, the transmission subscriber a-Sub transmits data to the connected subscribers.

At this time, as is shown in 44, if, due to insufficient bandwidth or to the line being busy, a connection is not established with one subscriber b-Sub for whom the MP connection is requested, the data from the transmission subscriber a-Sub can not be transmitted to the subscriber b-Sub. In this case, station B transmits re-transmission request notice F53 to station A. The re-transmission request notice F53 includes information concerning the connection disabled subscriber b-Sub.

Figure 45:
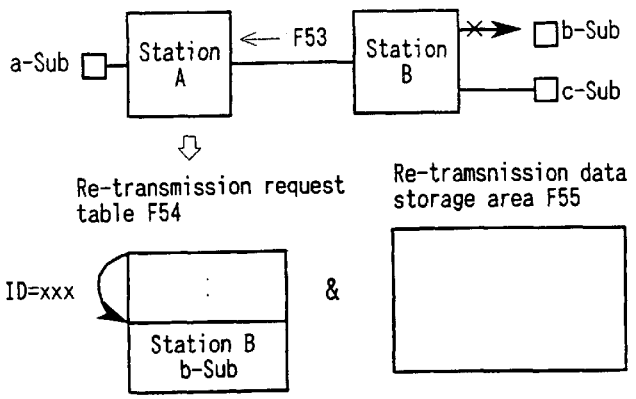

Following this, as is shown in FIG. 45, upon the receipt of the re-transmission request notice F53, station A examines a re-transmission request table F54 in an internally managed database, and captures, in accordance with the ID data, the information for the subscriber that is included in the re-transmission request notice F53.

In addition, in this embodiment, as is shown in FIG. 45, a re-transmission data storage area F55 for the storage of data to be re-transmitted is provided in a data storage area which is managed by station A.

Figure 46:
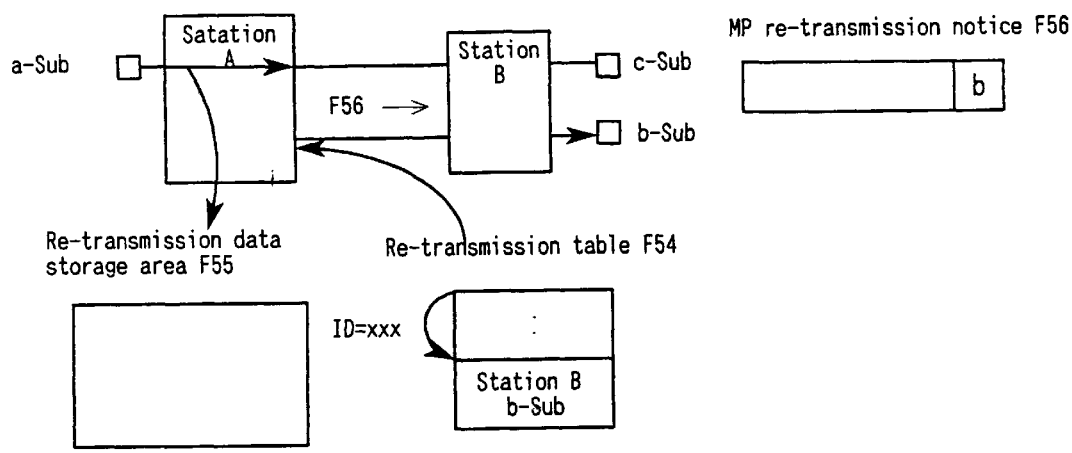

As is shown in FIG. 46, when data are to be transmitted to the subscriber c-Sub accommodated by station A, station A employs its data copying function to copy the data to be transmitted, and stores the data copy in the re-transmission data storage area F55. Further, in parallel with the transmission of data to the subscriber b-Sub and the storage of the copied data, station A examines the re-transmission request table F54 in its database to acquire the information for the subscriber for whom the re-transmission of data is required. In this embodiment, the subscriber for whom the re-transmission of data is required is subscriber b-Sub, as is described above. Station A transmits to station B MP re-transmission notice F56 including the data for the subscriber b-Sub.

Figure 47:
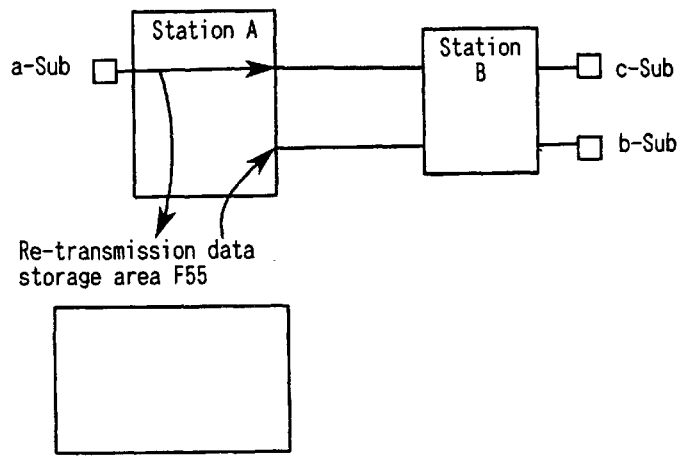

Upon the receipt of the MP re-transmission notice F56, station B issues a connection request to the subscriber b-Sub. When a connection with the subscriber b-Sub is established, as is shown in FIG. 47, station A reads the data from the re-transmission data storage area F55, and transmits it to the subscriber b-Sub. If the connection is not established, the above processing is repeated.

As is described above, in this embodiment as well as in the first through the fourth embodiment, data transmission delays can be prevented and the re-transmission of data is efficient. Further, in this embodiment, since data to be re-transmitted are stored in the re-transmission data storage area F55, even before the transmission of data is terminated, the re-transmission of data can be initiated for the subscriber for which the re-transmission of data is required and with whom a connection is established during the communication process.

[Sixth Embodiment]

Figure 48:
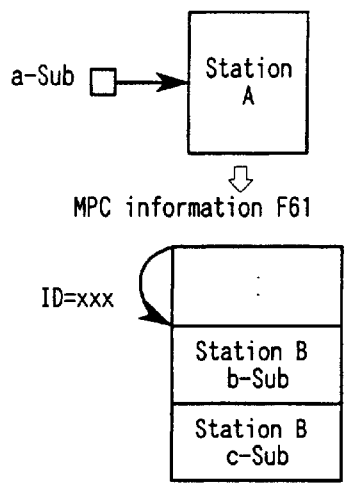
FIGS. 48 to 54 are diagrams for explaining a sixth embodiment of the present invention.

FIGS. 48 to 54 are diagrams for explaining a sixth embodiment of the present invention. In this embodiment, correspondence with the flowchart in FIG. 1 is not provided. In FIG. 48, a transmission subscriber a-Sub issues to a transmission station (station A) a request for an MP connection that corresponds to predetermined ID data, which is used to identify a subscriber that requests an MP connection.

Upon the receipt of the ID data, station A accesses MPC information data F61 in the database that it manages, and acquires information for an MP connection concerning requested subscribers and connected station information, both information items corresponding to the ID data. In this embodiment, the connected station information and the subscriber information, which correspond to the predetermined ID data, are for subscribers b-Sub and c-Sub that are accommodated by station B, as is shown in the MPC information F61 in FIG. 48.

Figure 49:
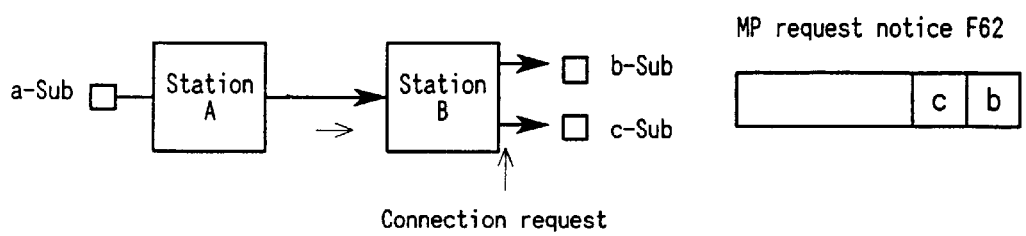

In FIG. 49, station A employs the acquired subscriber data to transmit the MP request notice F62 to station B. The MP request notice F62 to be transmitted include the information for the subscribers b-Sub and c-Sub. Station B employs the subscriber information included in the received MP request notice F62 to issue a connection request to the subscribers b-Sub and c-Sub. Then, the transmission subscriber a-Sub transmits data to the connected subscribers.

Figure 50:
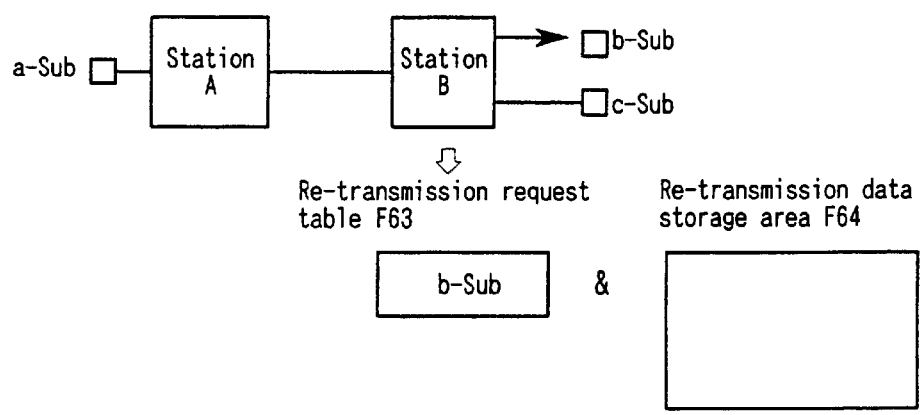

At this time, as is shown in FIG. 50, if, due to insufficient bandwidth or to the line being busy, as is shown in FIG. 50, a connection is not established with one subscriber b-Sub for whom the MP connection is requested, the data from the transmission subscriber a-Sub can not be transmitted to the subscriber b-Sub. In this case, station B acquires information for a connection disabled subscriber, i.e., information for the subscriber b-Sub, from a re-transmission request table F63 in the database it manages. Further, in this embodiment, as is shown in FIG. 50, a re-transmission data storage area F64 for the storage of data to be re-transmitted is provided in a data storage area which is managed by station B.

Figure 51:
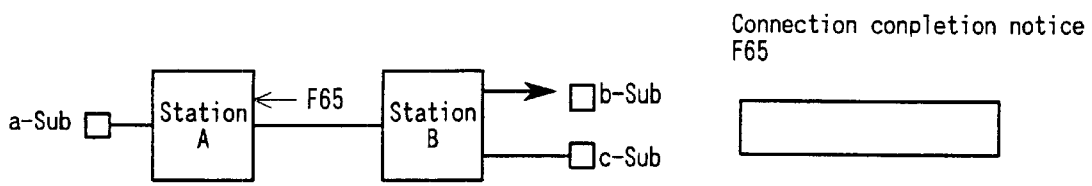

Unlike the above five embodiments, even though the connection with all the subscribers for whom MP connection is requested is not completed, station B does not transmit re-transmission request information, but as is shown in FIG. 51, it transmits a connection completion notice F65 to station A.

Figure 52:
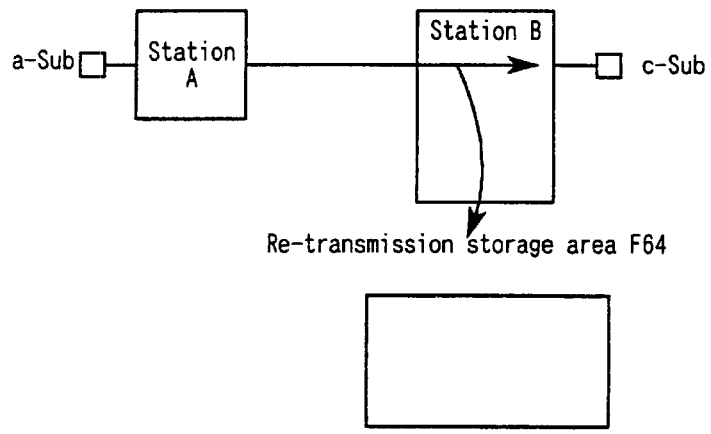
Figure 53:
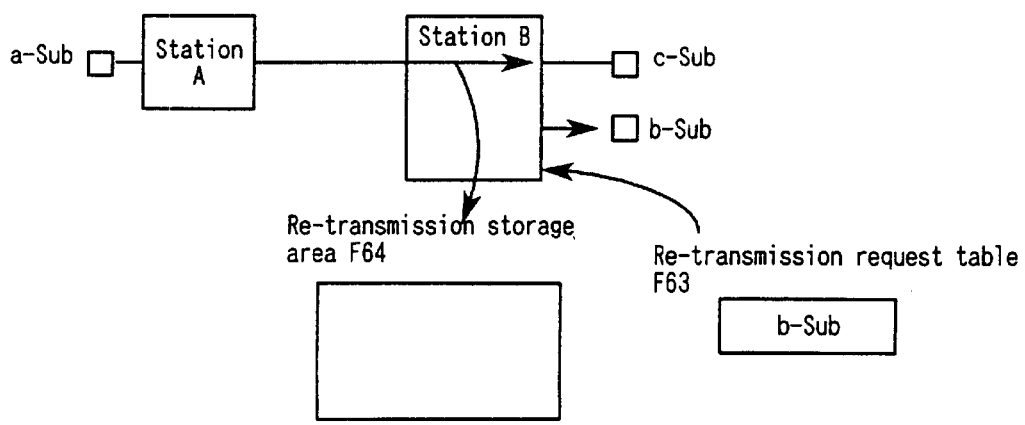

As is shown in FIG. 52, before station B transmits to the connected subscriber c-Sub the data that are received from station A, station B employs its data copying function to copy the data to be transmitted, and stores the data copy in the re-transmission data storage area F64. Further, in parallel with the transmission of data to the subscriber c-Sub and the storage of the copied data, as is shown in FIG. 53, station B examines the re-transmission request table F63 in its database to acquire the information for the subscriber for whom the re-transmission of data is required. In this embodiment, the subscriber for whom the re-transmission of data is required is subscriber b-Sub, the is described above. Station B thereafter issues a connection request to the subscriber b-Sub.

Figure 54:
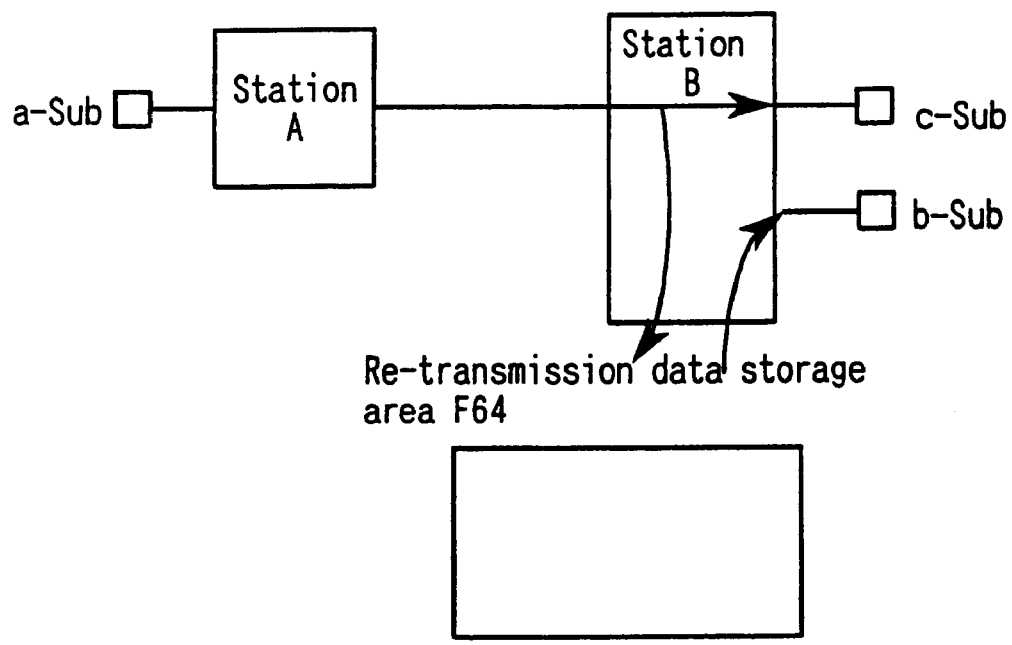

When a connection with the subscriber b-Sub is established, as is shown in FIG. 54, station B reads the data from the re-transmission data storage area F54, and transmits it to the subscriber b-Sub. If the connection is not established, the above processing is repeated.

As is described above, in this embodiment as well as the first through the fifth embodiments, data transmission delays can be prevented and the re-transmission of data is efficient. Further, in this embodiment as well as in the fifth embodiment, since data to be re-transmitted is stored in the re-transmission data storage area, even before the transmission of data is terminated, re-transmission of data can be initiated for the subscriber for whom the re-transmission of data is required and with whom a connection is established during the communication. Moreover, in this embodiment, since data to be re-transmitted are stored in the data storage area that is managed by the connected station, the transmission station and the connected station need not be connected at the time of re-transmission. Therefore, the bandwidth for the line can be reduced.

In the fifth and the sixth embodiments, if there are a plurality of subscribers for whom the re-transmission of data is required, or if the time when they are connectable differs, data are not always re-transmitted to these subscribers at the same time. This case can be handled by providing re-transmission data storage areas equivalent in count to the number of re-transmission requesting subscribers. However, this is not always possible when a large amount of data is to be transmitted.

A method for reducing the amount of data to be stored in the storage area will now be described while referring to FIG. 55.

Figure 55A:
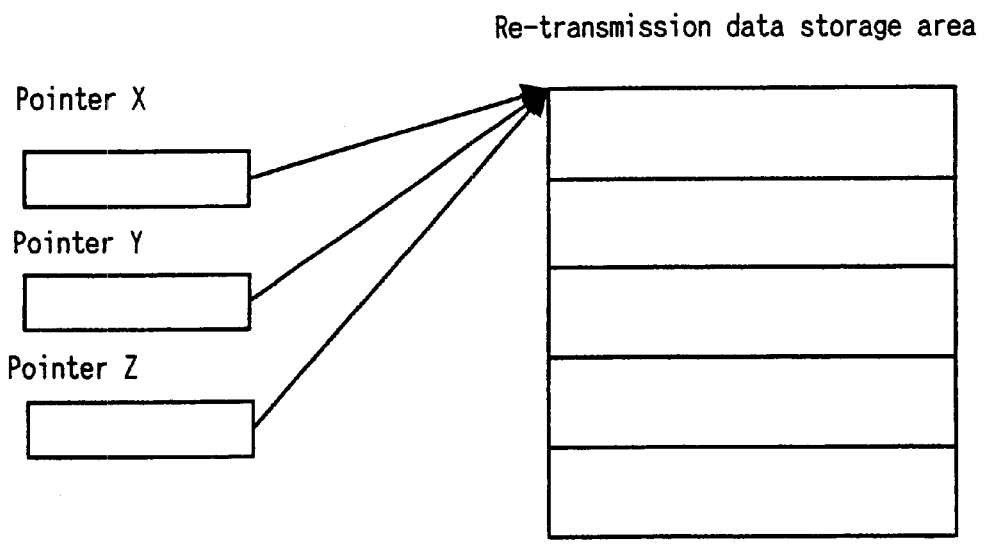
FIGS. 55A and 55B are diagrams illustrating a method for reducing the amount of data to be stored in the storage area.
Figure 55B:
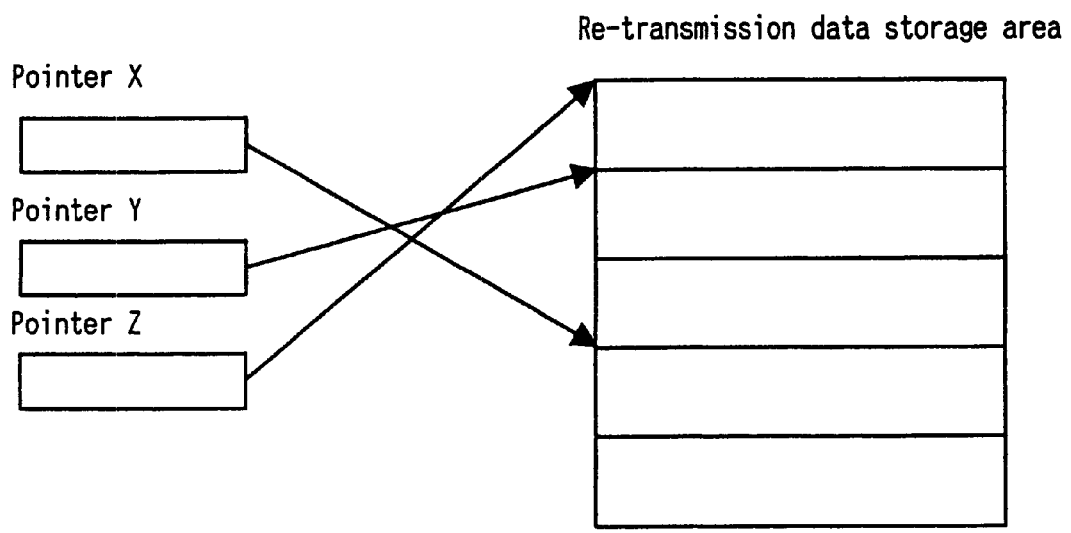
Figure 56A:
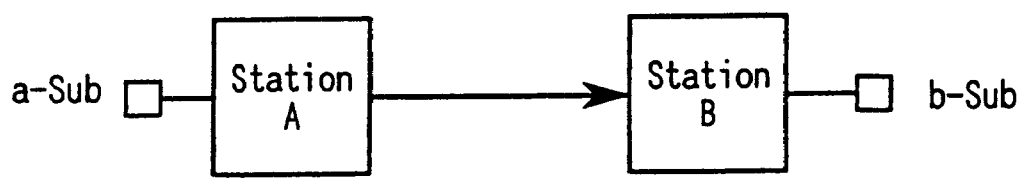
FIGS. 56A and 56B are diagrams showing a connection form for a B-ISDN.
Figure 56B:
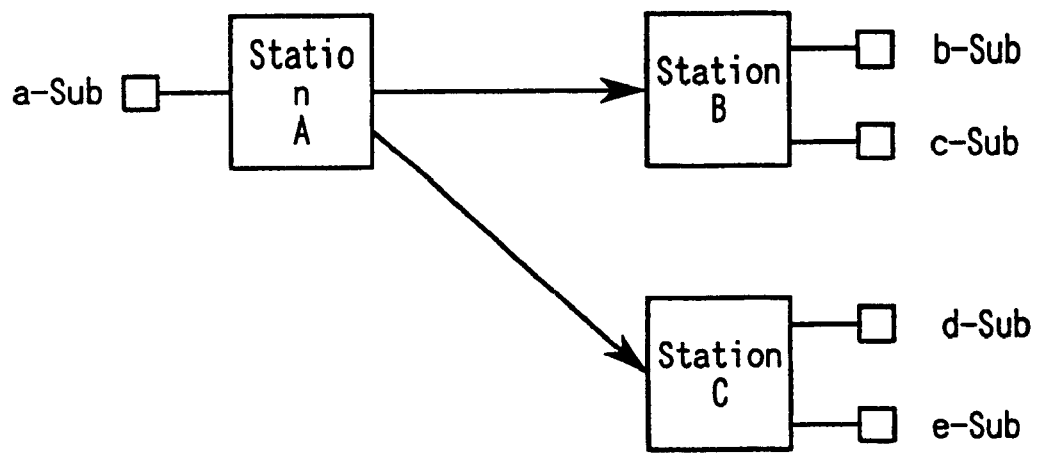

In FIGS. 55A and 55B, even when there are a plurality of subscribers for whom re-transmission is required, a single re-transmission data storage area is obtained. The re-transmission data area is divided into a plurality of addresses, for example, five in FIGS. 55A and 55B, and a plurality of pointers are provided for referencing the individual addresses. In FIGS. 55A and 55B, three pointers X, Y and Z are provided, and all reference the first address before the stored data are re-transmitted to the subscribers, as is shown in FIG. 55A.

When one of the subscribers for whom re-transmission of data is required, is ready to establish a connection, the pointer X, for example, is set to correspond to the subscriber. Then, as is shown in FIG. 55B, data at the addresses sequentially pointed to by the pointer X are copied by the switch (station) and are transmitted to the subscriber. At this time, when another subscriber is ready to establish a connection, the pointer Y is set to correspond to this subscriber. The data at the addresses sequentially pointed by the pointer Y are copied and transmitted in the same manner. As is described above, when a subscriber is ready to establish a connection, the data are transmitted sequentially, and a different address for each subscriber is designated by using a pointer. Therefore, when there are a plurality of subscribers for whom re-transmission is required, the re-transmission data storage area can be used in common, so that the amount of stored data can be reduced.

According to the present invention, when a connection with all the subscribers for whom MP connection is requested is not established, first, data are transmitted to connected subscribers, and upon the issuance of a re-transmission request after the transmission of data is completed, a MP connection request is re-issued to a connection disabled subscriber. Therefore, it is possible to prevent data transmission delays, which are caused by the halting of the data transmission until all the subscribers for whom the MP connection is requested can be connected. In addition, since in response to the re-issuance of a MP connection request, the MP connection is requested only for the connection disabled subscriber, transmission of data is not performed for the subscribers which have already received the data, so that efficient data transmission can be provided.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A re-connection method for a communication network system that enables a multipoint connection by which the same data is transmitted from a first subscriber accommodated in a first switch to a plurality of second subscribers accommodated in a second switch, the method comprising the steps of:

transmitting the data by the second switch to at least one of the second subscribers connected with the second switch;

re-transmission requesting by the second switch to the first switch for re-transmitting of the data to the at least one of the second subscribers; and re-connection requesting by the first switch to the second switch for re-connecting the at least one of the second subscribers which has not connected with the second switch.

2. The re-connection method according to claim 1, wherein the first switch stores information of the subscriber which has not connected with the second switch; and in the step of re-connection requesting, the first switch transmits the information to the second switch, and the second switch processes to connect to the subscriber based on the information.

3. The re-connection method according to claim 1, wherein the second switch stores information of the subscriber which has not connected with the second switch; and in the step of re-connection requesting, the second switch processes to connect to the subscriber based on the information.

4. The re-connection method according to claim 1, wherein a database of the communication network system stores information of the subscriber which has not connected with the second switch; and in the step of re-connection requesting, the first switch access to the database to obtain the information and transmits the information to the second switch, and the second switch processes to connect to the subscriber based on the information.

5. The re-connection method according to claim 1, wherein a database of the communication network system stores information of the subscriber which has not connected with the second switch; and in the step of re-connection requesting, the second switch accesses to the database to obtain the information, and the second switch processes to connect to the subscriber based on the information.

6. The re-connection method according to claim 1, further comprising the step of:

re-transmitting the data to the second switch for the subscriber connected with the second switch, which has not connected with the second switch.

7. The re-connection method according to claim 6, the step of re-connection requesting is processed after completion of transmitting the data by the transmitting step; and in the re-transmitting step, the second switch transmits the data to the subscriber connected with the second switch, which has not connected with the second switch.

8. The re-connection method according to claim 6, wherein the first switch stores the data;

the step of re-connection requesting is processed during transmitting the data by the transmitting step; and in the re-transmitting step, the first switch transmits the data to second switch for the subscriber connected with the second switch, which has not connected with the second switch during the transmitting the data by the transmitting step.

9. A re-connection method for a communication network system that enables a multipoint connection by which the same data is transmitted from a first subscriber accommodated in a first switch to a plurality of second subscribers accommodated in a second switch, the method comprising the steps of:

transmitting the data by the second switch to at least one of the second subscribers connected with the second switch;

storing the data in the second switch;

requesting for re-connection by the second switch to at least one of the second subscribers which has not connected with the second switch; and re-transmitting the data stored in the second switch to the subscriber connected with the second switch, which has not connected with the second switch.

10. A re-connection method for a communication network system that enables a multipoint connection by which the same data is transmitted from a first switch to a second switch and a third switch, the method comprising the steps of:

transmitting the data to subscribers connected with the second and third switch, which are accommodated in the second and third switch respectively;

re-transmission requesting by the second switch to the first switch for re-transmitting the data to at least one of the second subscribers which has not connected with the second switch;

transmitting a notice that there is no subscriber which has not connected with the third switch from the third switch to the first switch; and re-connection requesting by the first switch to the second switch for re-connecting with at least one of the second subscribers which has not connected with the second switch.

11. A switch for a communication network system that enables a multipoint connection by which the same data is transmitted from a first subscriber accommodated in a first switch to a plurality of second subscribers accommodated in a second switch, the first switch comprising:

first transmitting means for transmitting the data to the second switch for at least one second subscriber connected with the second switch; and second transmitting means for transmitting a notice to request for connection to the second switch according to a request for re-transmission of the data by the second switch, to connect with at least one additional second subscriber which has not connected with the second switch.

12. The switch according to claim 11, further comprising:

means for storing information for the subscriber which has not connected with the second switch; and wherein the second transmitting means transmits the information with the notice.

13. The switch according to claim 11, further comprising:

means for assessing to a database managed by the communication network, which stores information for a subscriber which has not connected with the second switch, to obtain the information; and wherein the second transmitting means transmits the information with the notice.

14. A switch for a communication network system that enables a multipoint connection by which the same data is transmitted from a first subscriber accommodated in a first switch to a plurality of second subscribers accommodated in a second switch, the second switch comprising:

means for transmitting a notice to request for re-transmission of the data to the first switch, to transmit the data to at least one second subscriber which has not connected; and means for re-connecting with the at least one second subscriber according to a request for re-connection by the first switch.

15. The switch according to claim 14, further comprising:

means for storing information for the subscriber which has not connected; and wherein the connecting means re-connects with the subscriber according to the information.

16. The switch according to claim 14, further comprising:

means for accessing to a database managed by the communication network, which stores information for a subscriber which has not connected with the second switch, to obtain the information; and wherein the connected means re-connects with the subscriber according to the information.

17. A switch for a communication network system that enables a multipoint connection by which the same data is transmitted from a first subscriber accommodated in a first switch to a plurality of second subscribers accommodated in a second switch, the second switch comprising:

means for transmitting the data to at least one second subscriber connected with the second switch;

means for storing the data to a storing unit in the second switch; and means for connecting with at least one additional second subscriber which has not connected to the second switch.

18. A communication network system comprising a first switch and a second switch, that enables a multipoint connection by which the same data is transmitted from a first subscriber accommodated in the first switch to a plurality of second subscribers accommodated in the second switch, wherein the first switch comprises first transmitting means for transmitting the data to the second switch for at least one of the second subscribers connected with the second switch; and second transmitting means for transmitting a notice to request for re-connection to the second switch, to connect with at least one of the second subscribers which has not connected with the second switch; and the second switch comprises third transmitting means for transmitting a notice to request for re-transmission of the data to the first switch, to transmit the data to the at least one of the second subscribers which has not connected; and means for re-connecting with the at least one of the second subscribers according to the request for re-connection by the first switch.

* * * * *